US010121306B2

(12) United States Patent
Peters et al.

(10) Patent No.: US 10,121,306 B2
(45) Date of Patent: **\*Nov. 6, 2018**

(54) SYSTEMS AND METHODS FOR FACILITATING CONSUMER-DISPENSER INTERACTIONS

(71) Applicant: The Coca-Cola Company, Atlanta, GA (US)

(72) Inventors: Dan Peters, Alpharetta, GA (US); Son V. Tran, Alpharetta, GA (US); David R. Newman, Atlanta, GA (US); Leonard F. Antao, Smyrna, GA (US); David O. Slagley, Roswell, GA (US); H. Brock Kolls, Alpharetta, GA (US)

(73) Assignee: The Coca-Cola Company, Atlanta, GA (US)

( * ) Notice: Subject to any disclaimer, the term of this patent is extended or adjusted under 35 U.S.C. 154(b) by 543 days.

This patent is subject to a terminal disclaimer.

(21) Appl. No.: 13/968,094

(22) Filed: Aug. 15, 2013

(65) Prior Publication Data

US 2014/0142749 A1 May 22, 2014
US 2016/0155285 A9 Jun. 2, 2016

Related U.S. Application Data

(60) Continuation of application No. 13/683,987, filed on Nov. 21, 2012, which is a division of application No.
(Continued)

(51) Int. Cl.
*G07F 11/00* (2006.01)
*B67D 1/00* (2006.01)
(Continued)

(52) U.S. Cl.
CPC .......... *G07F 11/002* (2013.01); *B67D 1/0041* (2013.01); *B67D 1/0888* (2013.01);
(Continued)

(58) Field of Classification Search
CPC .......... G07F 9/02; G07F 11/00; G07F 11/002; G07F 13/065; B67D 1/0041; B67D 1/0888; B67D 2210/00089; G06Q 20/3278
(Continued)

(56) References Cited

U.S. PATENT DOCUMENTS 3,991,911 A 11/1976 Shannon et al.
4,358,171 A 11/1982 Christen
(Continued)

FOREIGN PATENT DOCUMENTS

BE 1005369 6/1993
CN 1378432 11/2002
(Continued)

*Primary Examiner* — Michael Collins
(74) *Attorney, Agent, or Firm* — Eversheds Sutherland (US) LLP

(57) ABSTRACT

Embodiments of the invention can include systems and methods for dispensing consumable products. In one embodiment, a product dispenser is provided. The product dispenser can include a user interface operable to receive consumer inputs and to present product selection information. In addition, the product dispenser can include a reader configured to obtain identification information associated with a consumer. The product dispenser can include a controller in communication with the reader and user interface, and operable to execute a set of instructions to receive from the reader identification information associated with a consumer. The controller can also be operable to execute a set of instructions operable to retrieve consumer information based at least in part on the identification information, and provide product selection information at the user interface based at least in part on the consumer information.

20 Claims, 12 Drawing Sheets

Related U.S. Application Data

12/204,531, filed on Sep. 4, 2008, now Pat. No. 8,340,815.

(60) Provisional application No. 60/970,511, filed on Sep. 6, 2007, provisional application No. 60/970,509, filed on Sep. 6, 2007, provisional application No. 60/970,512, filed on Sep. 6, 2007.

(51) Int. Cl.
*B67D 1/08* (2006.01)
*G06Q 20/32* (2012.01)
*G06Q 30/02* (2012.01)
*G06Q 50/06* (2012.01)
*G07F 9/02* (2006.01)
*G07F 13/06* (2006.01)

(52) U.S. Cl.
CPC ......... *G06Q 20/3278* (2013.01); *G06Q 30/02* (2013.01); *G06Q 30/0207* (2013.01); *G06Q 50/06* (2013.01); *G07F 9/02* (2013.01); *G07F 11/00* (2013.01); *G07F 13/065* (2013.01); *B67D 2210/00089* (2013.01)

(58) Field of Classification Search
USPC .................................................. 700/231–244
See application file for complete search history.

(56) References Cited

U.S. PATENT DOCUMENTS

| | | | |
|---|---|---|---|
| 4,525,071 A | 6/1985 | Horowitz et al. |
| 4,563,739 A | 1/1986 | Gerpheide et al. |
| 4,819,176 A | 4/1989 | Ahmed et al. |
| 5,147,068 A | 9/1992 | Wright |
| 5,225,819 A | 7/1993 | Hosotani et al. |
| 5,312,017 A | 5/1994 | Schroeder et al. |
| 5,350,082 A | 9/1994 | Kiriakides, Jr. et al. |
| 5,358,145 A | 10/1994 | Smith et al. |
| 5,408,917 A | 4/1995 | Lussi |
| 5,603,430 A | 2/1997 | Loehrke et al. |
| 5,615,801 A | 4/1997 | Schroeder et al. |
| 5,691,684 A | 11/1997 | Murrah |
| 5,715,700 A | 2/1998 | Credle, Jr. |
| 5,735,436 A | 4/1998 | Schroeder et al. |
| 5,798,694 A | 8/1998 | Reber et al. |
| 5,839,610 A | 11/1998 | Reese et al. |
| 5,842,603 A | 12/1998 | Schroeder et al. |
| 5,884,807 A | 3/1999 | Yun |
| 5,997,924 A | 12/1999 | Olander, Jr. et al. |
| 6,053,359 A | 4/2000 | Goulet et al. |
| 6,116,460 A | 9/2000 | Kim et al. |
| 6,119,434 A | 9/2000 | Anderson |
| 6,131,399 A | 10/2000 | Hall |
| 6,152,591 A | 11/2000 | McCall et al. |
| 6,161,059 A | 12/2000 | Tedesco et al. |
| 6,238,721 B1 | 5/2001 | Knepler |
| 6,317,649 B1 | 11/2001 | Tedesco et al. |
| 6,354,468 B1 | 3/2002 | Riek |
| 6,377,868 B1 | 4/2002 | Gardner, Jr. |
| 6,378,275 B1 | 4/2002 | Anderson |
| 6,424,884 B1 | 7/2002 | Brooke et al. |
| 6,465,035 B1 | 10/2002 | Knepler |
| 6,470,233 B1 | 10/2002 | Johnson, Jr. |
| 6,479,086 B1 | 11/2002 | Knepler |
| 6,564,999 B1 | 5/2003 | Saveliev et al. |
| 6,572,016 B2 | 6/2003 | Saveliev et al. |
| 6,618,062 B1 | 9/2003 | Brown et al. |
| 6,622,064 B2 | 9/2003 | Bartholomew et al. |
| 6,658,323 B2 | 12/2003 | Tedesco et al. |
| 6,688,134 B2 | 2/2004 | Barton et al. |
| 6,698,228 B2 | 3/2004 | Kateman et al. |
| 6,751,525 B1 | 6/2004 | Crisp |
| 6,756,069 B2 | 6/2004 | Scoville et al. |
| 6,759,072 B1 | 7/2004 | Gutwein |
| 6,772,944 B2 | 8/2004 | Brown |
| 6,799,085 B1 | 9/2004 | Crisp |
| 6,807,460 B2 | 10/2004 | Black et al. |
| 6,907,741 B2 | 6/2005 | Kateman |
| 6,918,258 B2 | 7/2005 | Cunha et al. |
| 6,941,858 B2 | 9/2005 | Kateman |
| 6,968,876 B2 | 11/2005 | Yacko et al. |
| 6,973,478 B1 | 12/2005 | Ketonen et al. |
| 6,974,928 B2 | 12/2005 | Bloom |
| 6,980,886 B2 | 12/2005 | Shimoda et al. |
| 6,980,887 B2 | 12/2005 | Varga et al. |
| 6,982,640 B2 | 1/2006 | Lindsay et al. |
| 6,990,391 B1 | 1/2006 | Cunha et al. |
| 7,009,519 B2 | 3/2006 | Leonard et al. |
| 7,020,680 B2 | 3/2006 | Defosse |
| 7,028,861 B2 | 4/2006 | Sayers et al. |
| 7,031,804 B2 | 4/2006 | Brooke et al. |
| 7,032,818 B2 | 4/2006 | Thomas |
| 7,053,773 B2 | 5/2006 | McGarry et al. |
| 7,065,429 B1 | 6/2006 | McClain et al. |
| 7,082,970 B2 | 8/2006 | Bartholomew et al. |
| 7,147,131 B2 | 12/2006 | Sher et al. |
| 7,151,982 B2 | 12/2006 | Liff et al. |
| 7,156,259 B2 | 1/2007 | Bethuy et al. |
| 7,161,494 B2 | 1/2007 | Akuzawa |
| 7,223,427 B2 | 5/2007 | Knepler |
| 7,231,279 B2 | 6/2007 | Ghidotti |
| 7,234,609 B2 | 6/2007 | DeLazzer et al. |
| 7,249,050 B1 | 7/2007 | Walker et al. |
| 7,331,483 B2 | 2/2008 | Bhimani et al. |
| 7,353,080 B2 | 4/2008 | Walker et al. |
| 7,387,239 B2 | 6/2008 | Thomas et al. |
| 7,391,318 B2 | 6/2008 | Higashi |
| 7,395,134 B2 | 7/2008 | Bartholomew et al. |
| 7,499,768 B2 | 3/2009 | Hoersten et al. |
| 7,499,769 B2 | 3/2009 | Walker et al. |
| 7,627,496 B2 | 12/2009 | Walker et al. |
| 7,640,755 B1 | 1/2010 | Kateman |
| 7,660,767 B1 * | 2/2010 | Schultz ............. G06Q 20/1085 235/379 |
| 7,673,555 B2 | 3/2010 | Nosier et al. |
| 7,912,579 B2 | 3/2011 | Stettes |
| 7,918,368 B2 | 4/2011 | Crisp et al. |
| 8,340,815 B2 * | 12/2012 | Peters .................. B67D 1/0041 700/232 |
| 8,515,574 B2 * | 8/2013 | Studor .................... A47J 31/44 426/433 |
| 8,655,732 B1 * | 2/2014 | Wilinski et al. ................. 705/15 |
| 8,744,618 B2 * | 6/2014 | Peters .................. B67D 1/0041 700/236 |
| 8,755,932 B2 * | 6/2014 | Peters et al. .................. 700/233 |
| 2002/0059175 A1 | 5/2002 | Nakano |
| 2002/0065579 A1 | 5/2002 | Tedesco et al. |
| 2002/0077889 A1 | 6/2002 | Kolls |
| 2002/0116261 A1 | 8/2002 | Moskowitz et al. |
| 2002/0123926 A1 | 9/2002 | Bushold et al. |
| 2002/0129712 A1 | 9/2002 | Westbrook et al. |
| 2002/0143626 A1 | 10/2002 | Voltmer et al. |
| 2002/0161653 A1 | 10/2002 | Walker et al. |
| 2002/0183893 A1 | 12/2002 | Brooke et al. |
| 2003/0010791 A1 | 1/2003 | Gentiluomo et al. |
| 2003/0032474 A1 | 2/2003 | Kaminkow |
| 2003/0083758 A1 | 5/2003 | Williamson |
| 2003/0129286 A1 | 7/2003 | Knepler |
| 2003/0191709 A1 | 10/2003 | Elston et al. |
| 2003/0216964 A1 | 11/2003 | MacLean et al. |
| 2004/0044584 A1 | 3/2004 | Chung |
| 2004/0103033 A1 | 5/2004 | Reade et al. |
| 2004/0113786 A1 | 6/2004 | Maloney |
| 2004/0129720 A1 | 7/2004 | Cheng et al. |
| 2004/0226994 A1 | 11/2004 | Brown |
| 2004/0243259 A1 | 12/2004 | Peterson et al. |
| 2005/0003068 A1 | 1/2005 | Kester et al. |
| 2005/0075900 A1 | 4/2005 | Arguimbau |
| 2005/0087255 A1 * | 4/2005 | Humphrey et al. ............ 141/94 |
| 2005/0143857 A1 | 6/2005 | Chimomas |
| 2005/0167493 A1 | 8/2005 | Barton et al. |
| 2005/0178144 A1 | 8/2005 | Crisp |

(56) References Cited

U.S. PATENT DOCUMENTS

| | | |
|---|---|---|
| 2005/0178793 A1 | 8/2005 | Cheng et al. |
| 2005/0182599 A1 | 8/2005 | Knepler |
| 2005/0192705 A1 | 9/2005 | Pinney et al. |
| 2005/0205666 A1 | 9/2005 | Ward et al. |
| 2005/0258961 A1 | 11/2005 | Kimball et al. |
| 2005/0276883 A1 | 12/2005 | Jeffrey et al. |
| 2006/0000851 A1 | 1/2006 | Girard et al. |
| 2006/0043101 A1 | 3/2006 | Bhimani et al. |
| 2006/0043111 A1 | 3/2006 | Jennings et al. |
| 2006/0051614 A1 | 3/2006 | Su et al. |
| 2006/0054614 A1 | 3/2006 | Baxter et al. |
| 2006/0081653 A1 | 4/2006 | Boland et al. |
| 2006/0102645 A1 | 5/2006 | Walker et al. |
| 2006/0108415 A1 | 5/2006 | Thomas et al. |
| 2006/0111978 A1 | 5/2006 | Tietzen et al. |
| 2006/0115570 A1 | 6/2006 | Guerrero et al. |
| 2006/0115572 A1 | 6/2006 | Guerrero et al. |
| 2006/0131329 A1 | 6/2006 | Sayers et al. |
| 2006/0144244 A1 | 7/2006 | Girard et al. |
| 2006/0180647 A1 | 8/2006 | Hansen |
| 2006/0192003 A1 | 8/2006 | Chung |
| 2006/0224696 A1 | 10/2006 | King et al. |
| 2006/0247824 A1* | 11/2006 | Walker .................. G06Q 20/02 700/241 |
| 2006/0261156 A1 | 11/2006 | Brown |
| 2006/0272922 A1 | 12/2006 | Hoersten et al. |
| 2007/0016852 A1 | 1/2007 | Kim et al. |
| 2007/0027576 A1 | 2/2007 | Juds et al. |
| 2007/0044820 A1 | 3/2007 | Chan et al. |
| 2007/0087756 A1 | 4/2007 | Hoffberg |
| 2007/0124204 A1 | 5/2007 | De Boer et al. |
| 2007/0252709 A1 | 11/2007 | Collins et al. |
| 2007/0294129 A1* | 12/2007 | Froseth .................. G06Q 10/08 705/7.32 |
| 2007/0299555 A1 | 12/2007 | Walker et al. |
| 2008/0004973 A1 | 1/2008 | Rothschild |
| 2008/0029541 A1 | 2/2008 | Wallace et al. |
| 2008/0051193 A1 | 2/2008 | Kaminkow et al. |
| 2008/0116262 A1 | 5/2008 | Majer |
| 2008/0173705 A1 | 7/2008 | Girard et al. |
| 2008/0201241 A1* | 8/2008 | Pecoraro ................ G06Q 30/06 705/26.8 |
| 2009/0065520 A1 | 3/2009 | Peters et al. |
| 2009/0069930 A1 | 3/2009 | Peters et al. |
| 2009/0069931 A1 | 3/2009 | Peters et al. |
| 2009/0069949 A1 | 3/2009 | Carpenter et al. |
| 2009/0070234 A1 | 3/2009 | Peters et al. |
| 2009/0287579 A1* | 11/2009 | Walker .................. G06Q 20/18 705/21 |
| 2010/0114368 A1 | 5/2010 | Walker et al. |
| 2010/0116842 A1 | 5/2010 | Hecht |
| 2011/0315711 A1 | 12/2011 | Hecht et al. |
| 2012/0037008 A1 | 2/2012 | Rodriguez |
| 2013/0079926 A1* | 3/2013 | Peters et al. .................. 700/238 |
| 2013/0159174 A1* | 6/2013 | Walker .................. G06Q 20/18 705/39 |
| 2014/0142749 A1* | 5/2014 | Peters et al. .................. 700/241 |
| 2014/0163725 A1* | 6/2014 | Wilinski et al. .............. 700/237 |

FOREIGN PATENT DOCUMENTS

| | | |
|---|---|---|
| DE | 4013147 | 10/1991 |
| EP | 1165428 | 7/2003 |
| EP | 1626375 | 2/2006 |
| EP | 1637055 | 3/2006 |
| FR | 2624844 | 6/1989 |
| GB | 2416757 | 2/2006 |
| JP | S59-055597 | 3/1984 |
| JP | S61-288289 | 12/1986 |
| JP | H05-094577 | 4/1993 |
| JP | H05-128349 | 5/1993 |
| JP | H05-089329 | 9/1993 |
| JP | H11-262649 | 9/1999 |
| JP | 2000-099822 | 4/2000 |
| JP | 2001-250161 | 9/2001 |
| JP | 2001-319026 | 11/2001 |
| JP | 2002-099950 | 4/2002 |
| JP | 2002-245536 | 8/2002 |
| JP | 2002-538561 | 11/2002 |
| JP | 2003-016164 | 1/2003 |
| JP | 2003-506184 | 2/2003 |
| JP | 2003-121505 | 4/2003 |
| JP | 2003-303372 | 10/2003 |
| JP | 2003-337974 | 11/2003 |
| JP | 2005-276148 | 10/2005 |
| JP | 2006-309336 | 11/2006 |
| JP | 2009524868 | 7/2009 |
| RU | 2054901 | 5/1996 |
| RU | 2146102 | 10/2000 |
| RU | 2297385 | 4/2007 |
| WO | 9837518 | 8/1998 |
| WO | 0211087 | 2/2002 |
| WO | 02083282 | 10/2002 |
| WO | 2005063091 | 7/2005 |
| WO | 20050091236 | 9/2005 |
| WO | 2006101394 | 9/2006 |
| WO | 2006131431 | 12/2006 |
| WO | 2007056407 | 5/2007 |
| WO | 2007070032 | 6/2007 |
| WO | 2007085925 | 8/2007 |
| WO | 2007127525 | 11/2007 |
| WO | 2009032911 | 3/2009 |
| WO | 2009032938 | 3/2009 |
| WO | 2009032942 | 3/2009 |
| WO | 2009032946 | 3/2009 |

* cited by examiner

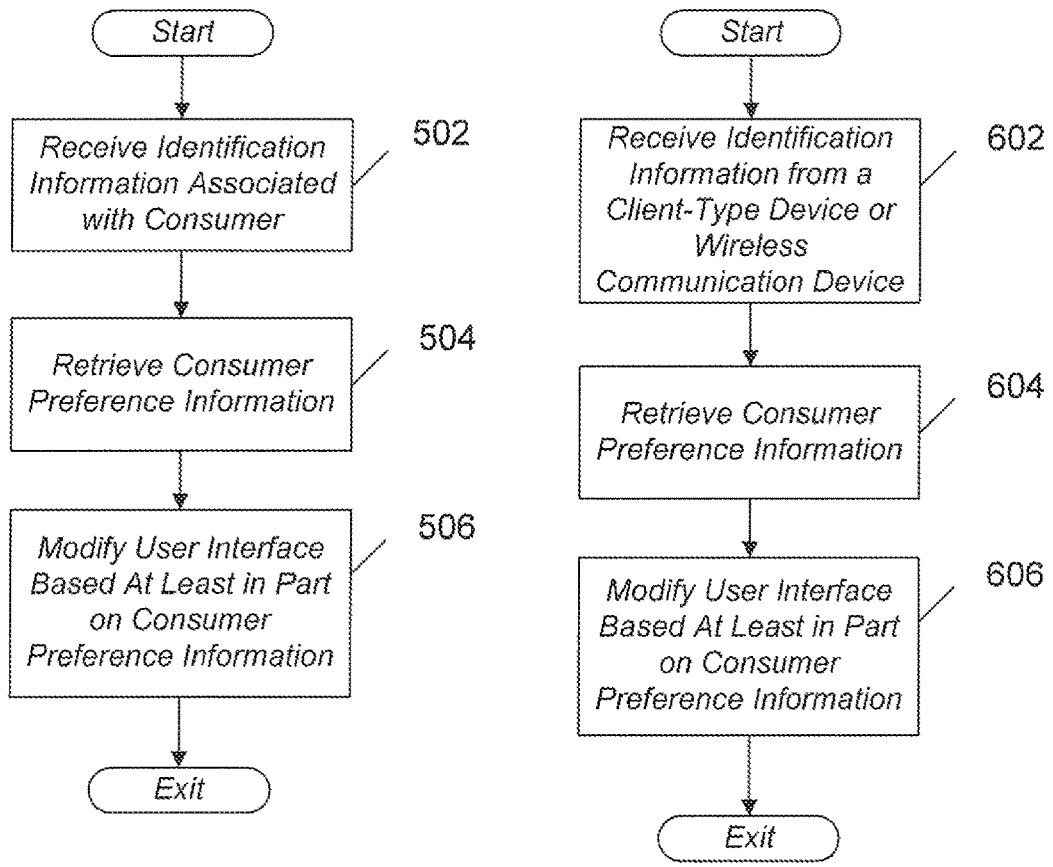

700

800

900

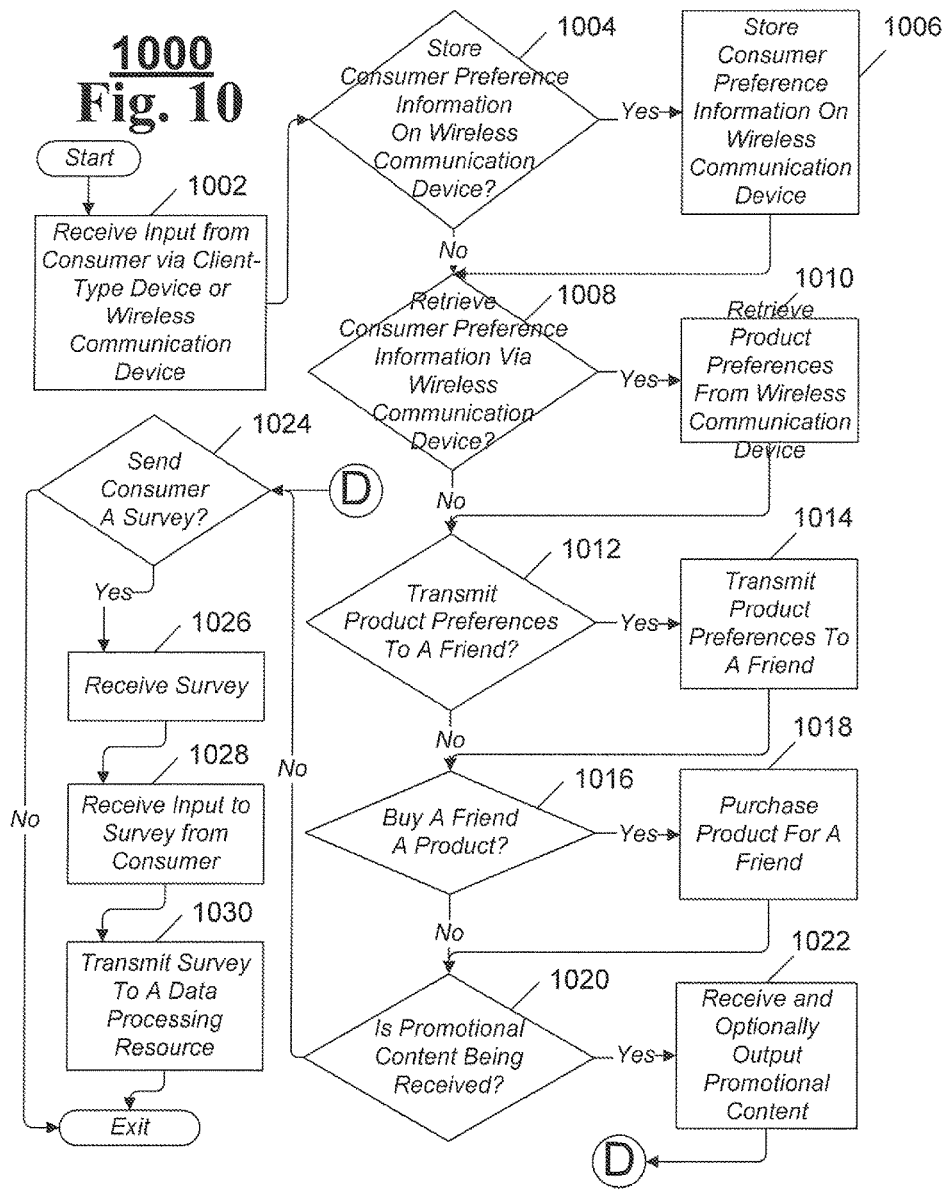

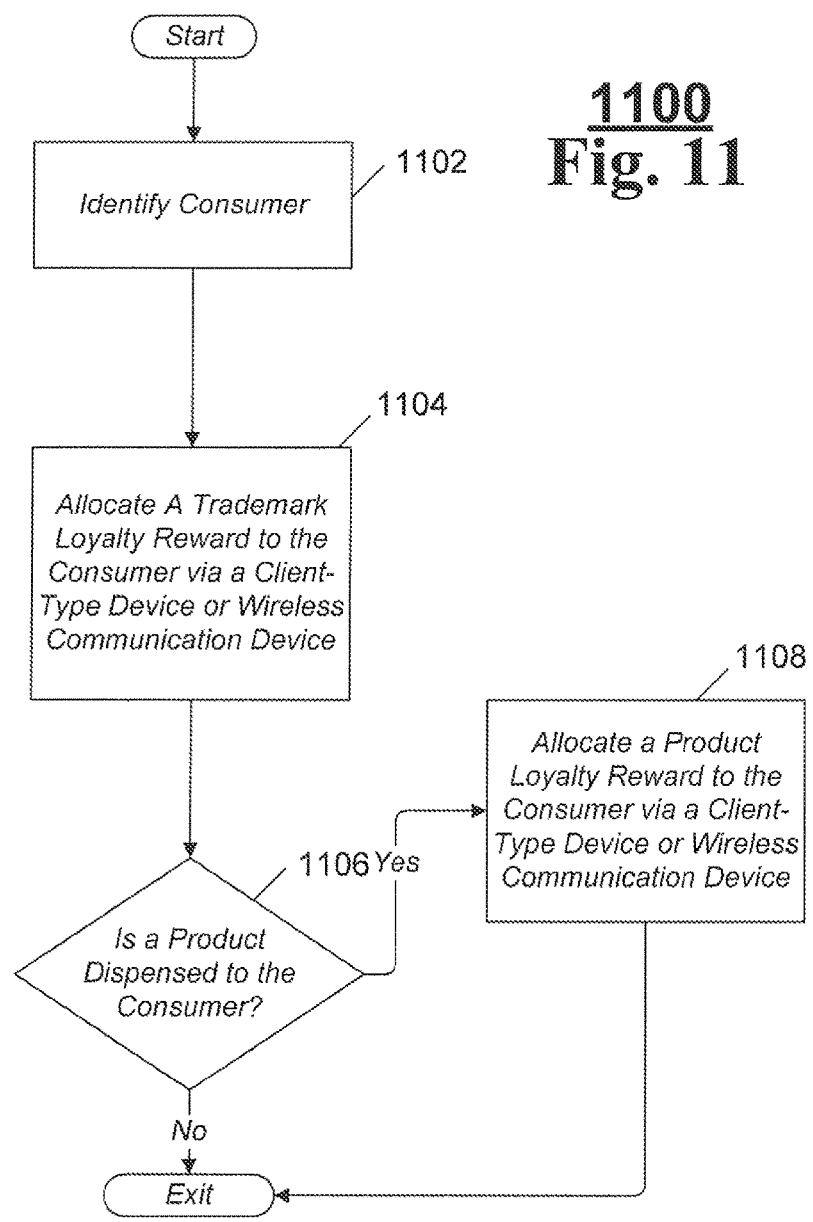

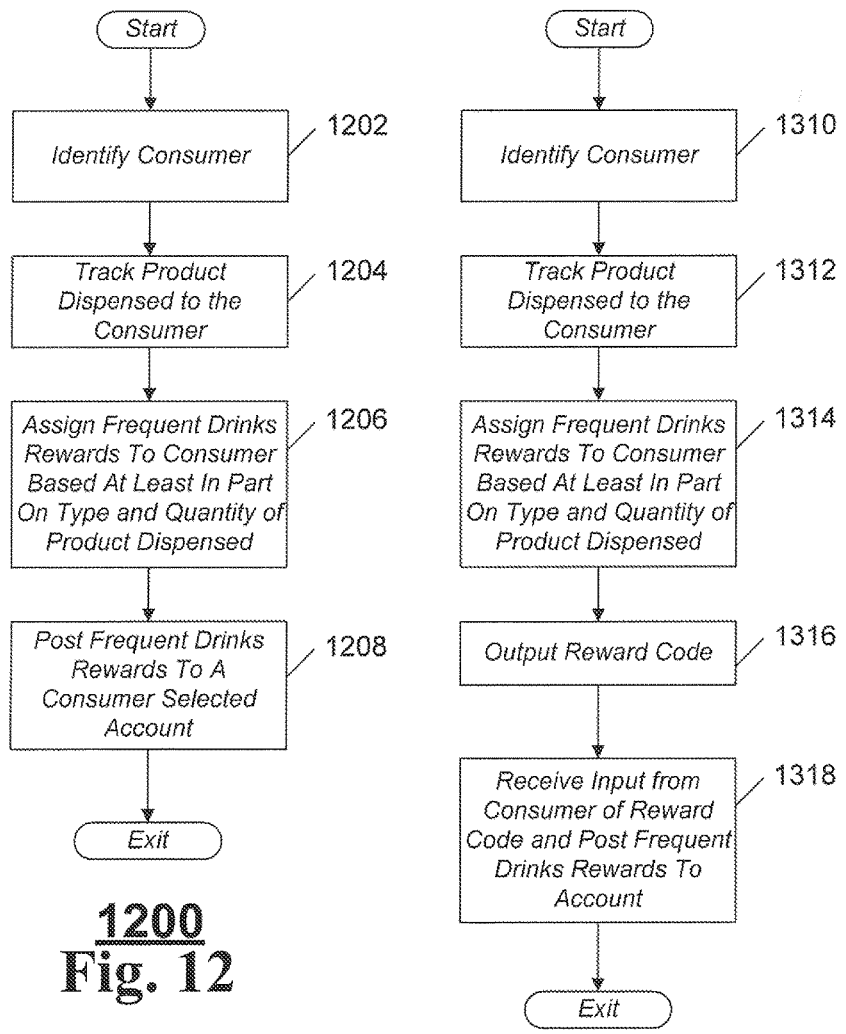

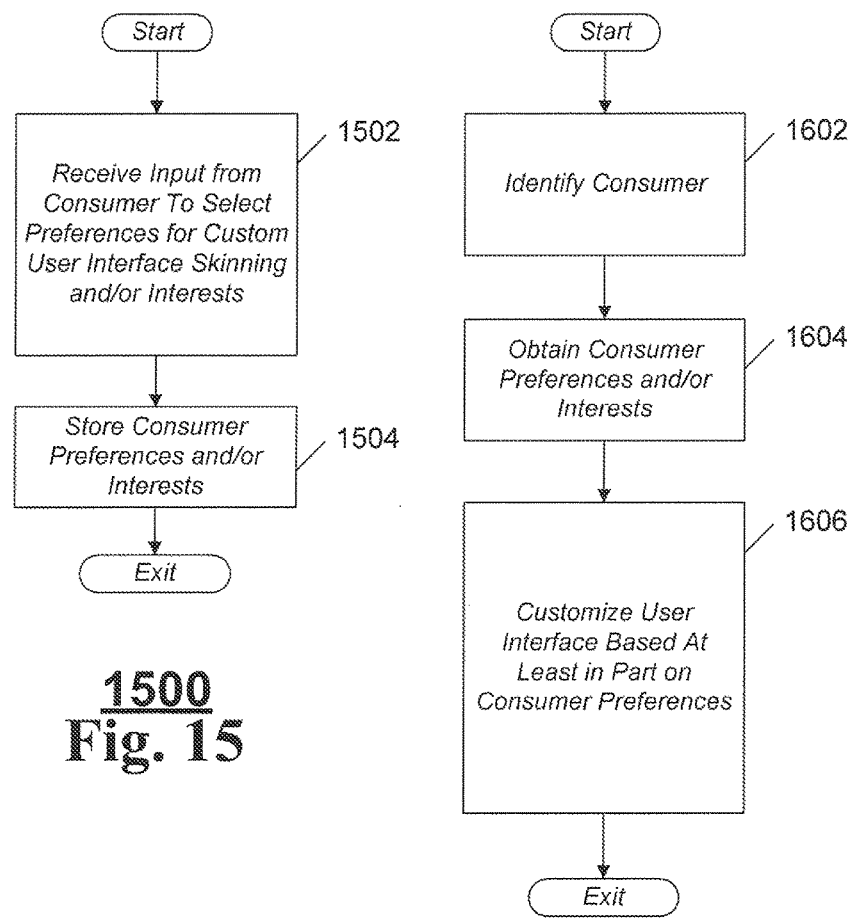

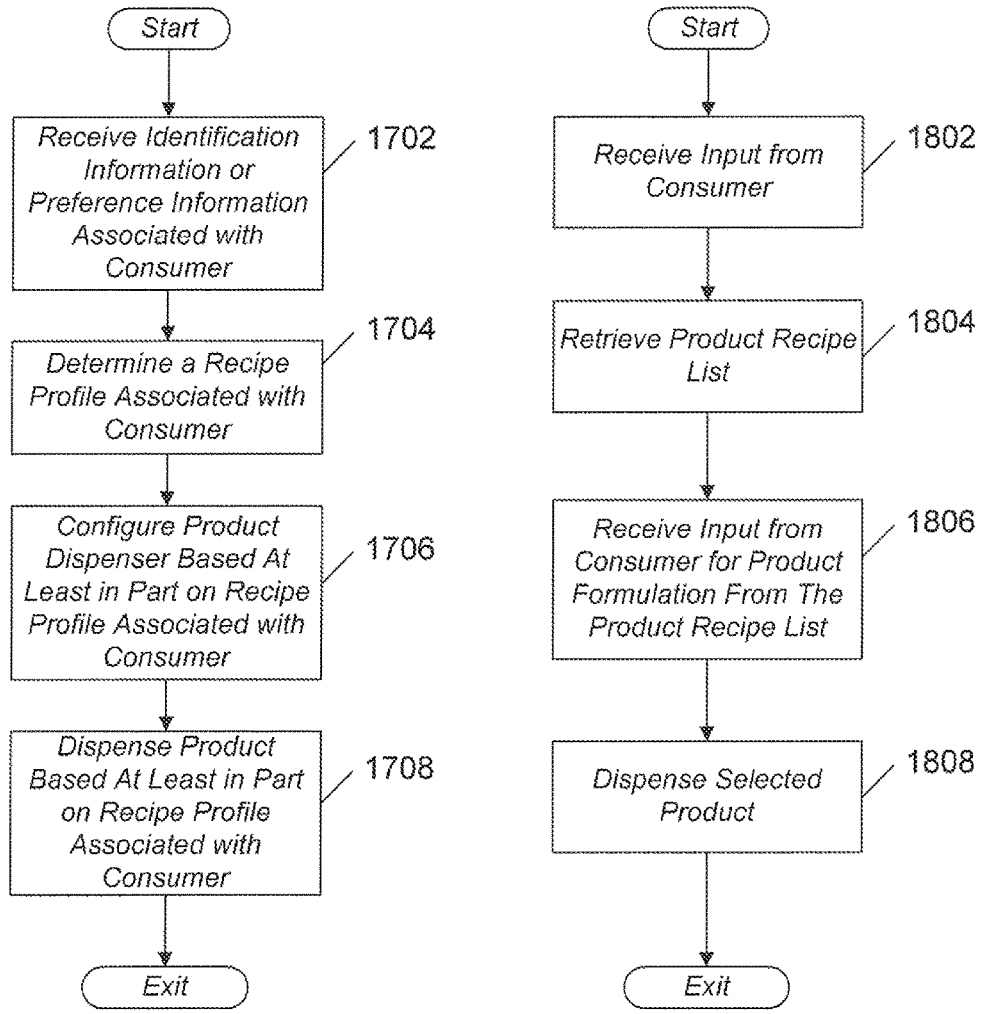

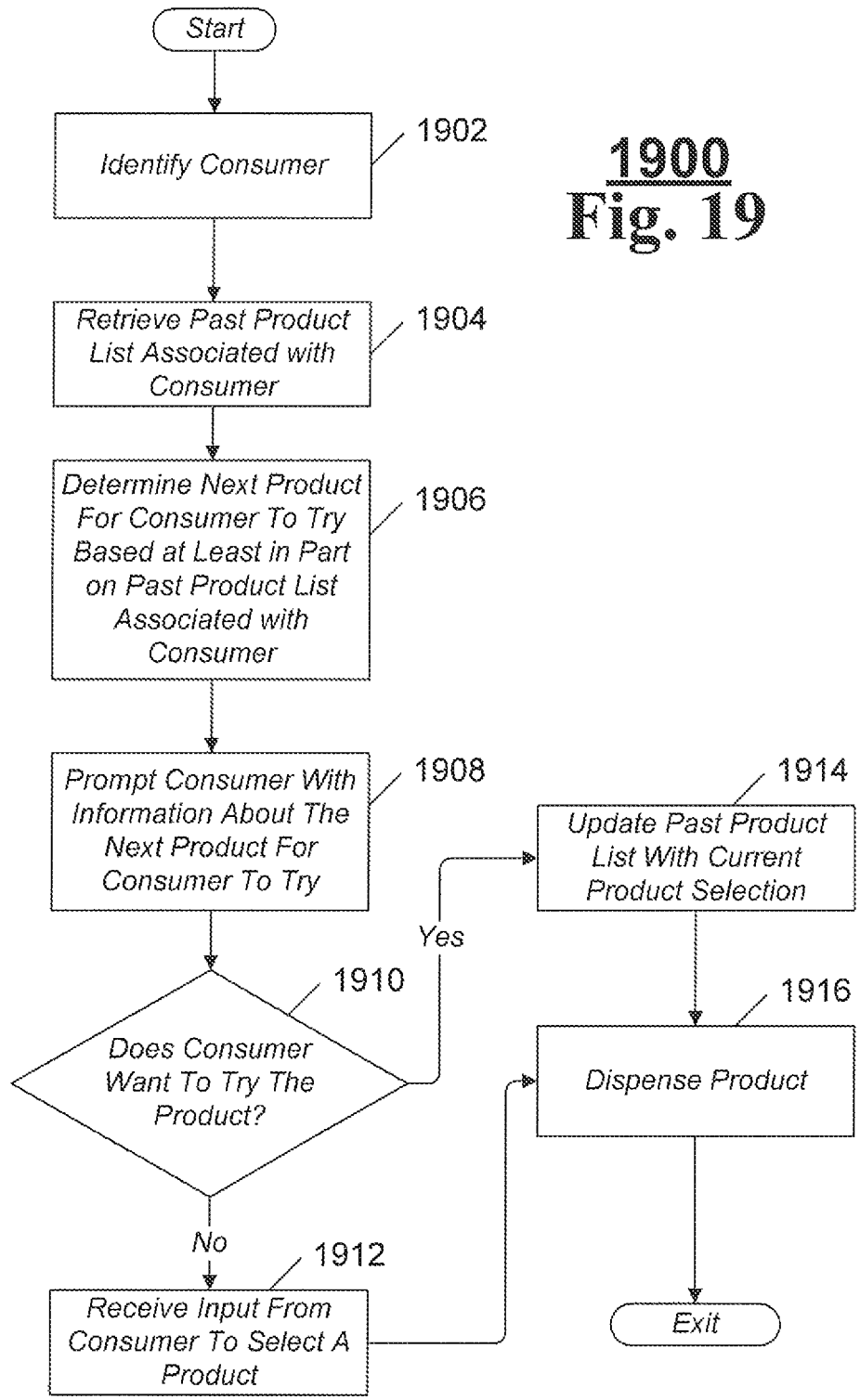

SYSTEMS AND METHODS FOR FACILITATING CONSUMER-DISPENSER INTERACTIONS

CROSS-REFERENCE TO RELATED APPLICATIONS

The present application is a continuation of and claims priority to U.S. Ser. No. 13/683,987, titled "Systems and Methods for Facilitating Consumer-Dispenser Interactions," filed on Nov. 21, 2012, which claims priority to U.S. Ser. No. 12/204,531, titled "Systems and Methods for Facilitating Consumer-Dispenser Interactions," filed Sep. 4, 2008, now issued as U.S. Pat. No. 8,340,815, which claims priority to U.S. Serial Nos. 60/970,509, 60/970,511, and 60/970,512, all three of which are titled "Systems and Methods for Facilitating Consumer-Dispenser Interactions," all three of which were filed Sep. 6, 2007, and wherein all of foregoing applications are incorporated by reference.

TRADEMARKS

COCA-COLA® is a registered trademark of The Coca-Cola Company, Atlanta, Ga., U.S.A. Other names, symbols, designs, or logos used herein may be registered trademarks, trademarks or product names of The Coca-Cola Company or other companies.

TECHNICAL FIELD

This invention relates to product dispensers, and in particular, relates to systems and methods for facilitating consumer-dispenser interactions.

BACKGROUND OF THE INVENTION

Conventional beverage dispensers can pour a beverage by combining a syrup, sweetener, and/or water. To create a finite variety of beverage selections different kinds of syrup can be offered. This typically results in being able to offer a finite number of branded and non-branded beverage selections. As an example, a single prior art dispenser using several different kinds of syrup might be able to offer limited choices of COCA-COLA™, DIET COCA-COLA™, SPRITE™, and a few other branded or non-branded beverage selections.

One problem with these types of conventional beverage dispensers is that only a limited number of drinks can be offered. As such, conventional beverage dispensers may be limited in being able to offer the consumer what they want. In this regard, consumers want a wider menu of beverage selections and the ability to customize their beverage. Research suggests that they want more beverage variations even for a traditional branded beverage. For example, offering COCA-COLA™, COCA-COLA™ with lime, CHERRY COCA-COLA™, VANILLA COCA-COLA™ and numerous other types of COCA-COLA™ beverage variations. Offering all the variations possible for a single drink brand such as COCA-COLA™ is impractical in conventional beverage dispensers in part because conventional beverage dispensers have limited capacity and selection capability. They may not offer the consumer what the consumer wants, that is, a complete variety of choices for all types of branded and non-branded beverages.

SUMMARY OF THE INVENTION

Some or all of the above needs and/or problems may be addressed by embodiments of the invention. Certain embodiments of the invention can include systems and methods for facilitating consumer-dispenser interactions. In one embodiment, a product dispenser is provided. The product dispenser can include a user interface operable to receive consumer inputs and to present product selection information. In addition, the product dispenser can include a reader configured to obtain identification information associated with a consumer. The product dispenser can include a controller in communication with the reader and user interface, and operable to execute a set of instructions operable to receive from the reader identification information associated with a consumer. The controller can also be operable to execute a set of instructions operable to retrieve consumer information based at least in part on the identification information, and provide product selection information at the user interface based at least in part on the consumer information.

In another embodiment, a method for operating a product dispenser is provided. The method can include receiving identification information associated with a consumer. In addition, the method can include retrieving consumer information based at least in part on the identification information. Moreover, the method can include providing product selection information at a user interface associated with the product dispenser based at least in part on the consumer information.

Furthermore, a method for operating a product dispenser can be provided. The method can include receiving identification information associated with a consumer. In addition, the method can include retrieving consumer information based at least in part on the identification information. Furthermore, the method can include customizing product selection information at a user interface associated with the product dispenser based at least in part on the consumer information. Moreover, the method can include updating the consumer information based at least in part on the selected product.

Additional systems, methods, dispensers, features and aspects are realized through the techniques of various embodiments of the invention. Other embodiments and aspects of the invention are described in detail herein and are considered a part of the claimed invention. Other aspects and features can be understood with reference to the description and to the drawings.

BRIEF DESCRIPTION OF THE FIGURES

The subject matter which is regarded as the invention is particularly pointed out and distinctly claimed in the claims at the conclusion of the specification. The foregoing and other objects, features, and aspects of the invention are apparent from the following detailed description taken in conjunction with the accompanying drawings in which:

FIG. 5 illustrates an example method of transitioning between an enhanced product dispenser consumer interface and a classic product dispenser consumer interface in accordance with an embodiment of the invention.

FIG. 6 illustrates an example method of transitioning between an enhanced product dispenser consumer interface and a classic product dispenser consumer interface in accordance with an embodiment of the invention.

FIG. 10 illustrates one example method of a product dispenser interacting with at least one data processing device in accordance with an embodiment of the invention.

FIG. 11 illustrates one example method of a consumer receiving a different type and/or kind of loyalty reward based in part on whether the consumer has dispensed a product in accordance with an embodiment of the invention.

FIGS. 12-14 illustrate example methods of implementing a frequent drinks program to earn free drinks in accordance with an embodiment of the invention.

FIGS. 15-16 illustrate example methods of using consumer preferences to customize user interface skinning, and displaying digital content related to consumer interests in accordance with an embodiment of the invention.

FIG. 17 illustrates one example method of the consumer providing encoded media having a recipe profile to effectuate selection of a product or beverage in accordance with an embodiment of the invention.

FIG. 18 illustrates one example method of using a consumer specific code to store and retrieve a product or beverage list in accordance with an embodiment of the invention.

FIG. 19 illustrates one example method of enabling a consumer to try each of a plurality of product or beverage formulations.

The detailed description explains various embodiments of the invention, together with aspects and features, by way of example with reference to the drawings.

DETAILED DESCRIPTION OF EMBODIMENTS OF THE INVENTION

As used herein, the terms "beverage dispenser", "product dispenser", "beverage product dispenser", "dispenser apparatus", and "dispenser" refer to a device which dispenses a product such as a beverage, can, bottle, or container.

As used herein, the terms "product" and "beverage", and their pluralized forms, are used synonymously, and embodiments of the invention should not be limited in scope by the use of either term.

Figure 1:
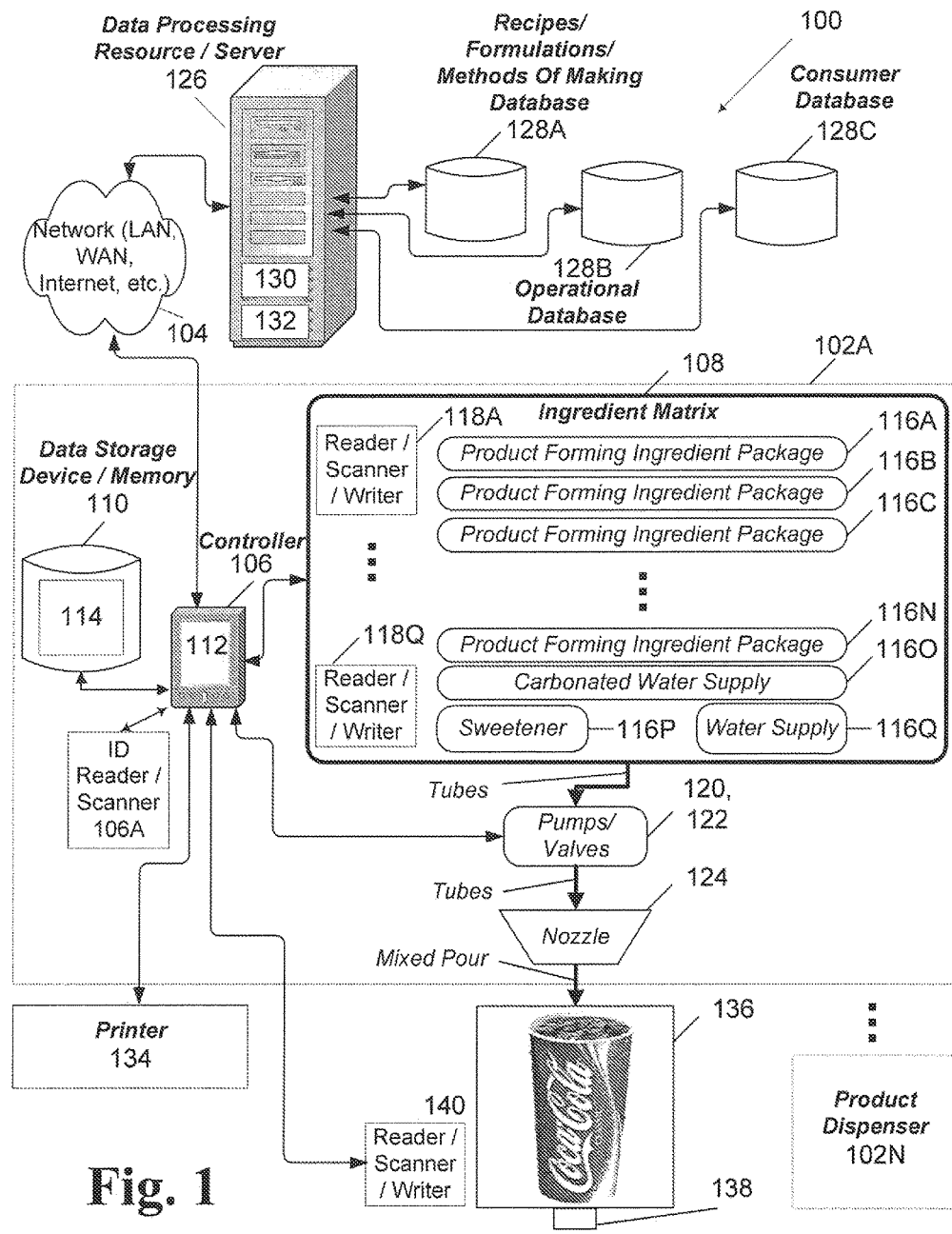
FIG. 1 illustrates an example system including a product dispenser and associated network in accordance with an embodiment of the invention.

Turning now to the drawings in greater detail, an example system 100 for a product dispenser according to an embodiment of the invention is shown in FIG. 1. The example system, such as 100, can operate with a networked computer environment which includes at least one network in communication with a product dispenser. For example in FIG. 1, a product dispenser, such as 102A, is shown in communications with a communications network, such as 104. In this embodiment, at least one of the product dispensers, such as 102A, can interface with a consumer, customer, or other user. Other example environments or systems for a product dispenser according to an embodiment of the invention may include non-network configurations.

The example product dispenser, such as 102A shown in FIG. 1, can be a client-type device. Each product dispenser, such as 102A-102N, can be a computer or processor-based device capable of communicating with the communications network, such as 104, via a signal, such as a wireless frequency signal or a direct wired communication signal.

Each product dispenser, such as 102A, can include a processor or controller 106, an identification reader/scanner device 106A, an ingredient matrix 108, a computer-readable medium, such as a random access memory (RAM) 110, coupled to the processor or controller 106, and an input/output device, such as display device 112. The processor or controller, such as 106, can execute computer-executable program instructions stored in memory, such as 110. Computer executable program instructions stored in memory, such as 110, can include any number of module application programs, such as a consumer interaction engine or module, such as 114. The consumer interaction engine or module, such as 114, can be adapted to implement various methods for consumer-dispenser interactions. In addition, a consumer interaction engine or module, such as 114, can be adapted to receive one or more signals from one or more consumers, remote and/or local servers or data processing resources, and client-type devices or wireless communication devices. Other examples of functionality and aspects of embodiments of a consumer interaction engine or module, such as 114, are described below.

The identification reader/scanner device 106A shown in FIG. 1 can be in communication with the controller 106, and can receive or otherwise obtain identification information from any number of devices or means associated with a consumer. For example, an identification reader/scanner device, such as 106A, can include a machine readable code technology such as bar code, or may include any wireless communication technology such as RFID, reflected light frequency, optical, etc.

As shown in FIG. 1, the processor or controller, such as 106, can be in communication with an ingredient matrix, such as 108, to control, monitor, and track the addition, flow, and removal of some or all of the ingredients to or from the matrix, such as 108. An ingredient matrix can be, for example, a series of receptacles or mountings capable of receiving or mounting to a respective product ingredient package or other product ingredient supply. For example, a product ingredient package, such as 116A, can be manufactured as a pouch of liquid secured in a plastic ridged container to allow insertion into an ingredient matrix, such as 108. When inserted into the ingredient matrix, such as 108, the package, such as 116A, or pouch can be pierced by at least one associated fitting which allows the liquid in the package, such as 116A, or pouch to be pumped or otherwise metered by the controller, such as 106, or the matrix, such as 108 and associated equipment in precise ratios to form the desired product, such as a beverage. In one embodiment, one or more product ingredient packages, such as 116A-116Q, can be inserted into an ingredient matrix, such as 108. The ingredient matrix, such as 108, in this embodiment can secure some or all of the product ingredient packages, such as 116A-116Q. In one embodiment, one or more product packages, such as 116O, 116P, 116Q, may be direct supplies rather than packages. For example, a product package, such as 116O, can be a continuous supply of carbonated water provided from a carbonated water source; a product package, such as 116P, can be a sweetener provided from a sweetener source such as a non-nutritive sweetener (NNS) or high fructose corn syrup (HFCS); and a product package, such as 116Q, can be a continuous supply of water from a tap, purified, or distilled water source. In any embodiment, ingredients, components, or product additives may be in the form of a pouch, or may be in another configuration suitable for access by the ingredient matrix, such as 108.

In the embodiment shown in FIG. 1, a product dispenser, such as 102A, with an ingredient matrix, such as 108, can include one or more machine readable code readers, such as 118A-118Q, utilizing a machine readable code technology such as bar code, RFID, reflected light frequency, optical, etc. In one embodiment, at least one machine readable code reader, such as 118A-118Q, can be associated with a location associated with an ingredient matrix, such as 108, wherein some or all of the product ingredient packages, such as 116A-116Q, can be scanned, read, or otherwise identified prior to insertion into or connection with the ingredient matrix, such as 108. In this regard, the processor or controller, such as 106, can receive or obtain information related to some or all of the product ingredient packages, such as 116A-116Q, and use such information to identify within the ingredient matrix, such as 108, an optimum or other desired location within the ingredient matrix, such as 108, for placement of the product ingredient package, such as 116A. For example, data from a product ingredient package, such as 116A, can be read, scan, or identified from a serial number or identification code associated with the product ingredient package, such as 116A. Such data can be utilized alone or correlated with previously stored information in at least one database, such as 128A-128C, described below, or with data otherwise accessible or stored by a data processing resource or server, described below such as 126, which may identify one or more ingredients associated with the product ingredient package, such as 116A. In another example, data from a product ingredient package, such as 116A, can be a ingredient code or identifier, and can be utilized alone or correlated with previously stored information in a database, such as 128A-128C, or with data otherwise accessible or stored by a data processing resource or server, such as 126, which may identify one or more ingredients associated with the product ingredient package, such as 116A.

In the embodiment shown in FIG. 1, a product dispenser, such as 102A, with an ingredient matrix, such as 108, can include one or more pumps and/or valves, such as 120 and 122, respectively, and a nozzle, such as 124. In this example, each of the pumps, such as 120, and valves, such as 122, can be controlled by the product dispenser, such as 102A. For instance, the processor or controller, such as 106, can be in communication with some or all of the pumps, such as 120, and valves, such as 122. In this regard, some or all of the pumps, such as 120, and/or valves, such as 122, can be selectively operated by the processor or controller, such as 106, to pump, meter, or otherwise obtain respective product products or ingredients from certain of the product ingredient packages, such as 116A-116Q, to dispense a custom product or beverage.

In one embodiment, an ingredient matrix, such as 108, can have multiple product ingredient packages, such as 116A-116Q, inserted into it, wherein each package may contain a different or unique ingredient. By way of one or more commands or instructions from a processor or controller, such as 106, to one or more pumps, such as 120, and/or valves, such as 122, associated with the ingredient matrix, such as 108, varying ratios of ingredients from some or all of the product ingredient packages, such as 116A-116Q, can be selectively combined to form various types of products, such as beverages. Example ingredients can include, but are not limited to, a flavoring, a concentrate, a syrup, a sweetener, water, carbonated water, a lime flavoring, vanilla flavoring, cherry flavoring, and any ingredient part of a branded or non-branded drink, such as CHERRY COCA-COLA™, VANILLA COCA-COLA™, COCA-COLA™, DIET COCA-COLA™, and FANTA™.

In one embodiment, one or more of the product ingredient packages, such as 116A-116Q, may contain ingredients referred to as "pungent", which may limit their placement within an ingredient matrix, such as 108. Pungent-type ingredients can be relatively strong such that once a pungent ingredient is pumped or otherwise drawn through a particular portion of a product dispenser, such as 102A, any associated path through the dispenser, such as 102A, such as tubing in the product dispenser, such as 102A, may be permanently flavored and any subsequent ingredient or fluid that is pumped or drawn through the path or tubing may be tainted with the taste of the pungent-type ingredient. As such, once a pungent-type ingredient is used in an ingredient matrix, such as 108, an associated processor or controller, such as 106, can track or otherwise store information that controls or limits the replacement and/or addition of other pungent ingredients to certain locations of the ingredient matrix, such as 108, to avoid mixing pungent-type ingredients or tainting non-pungent ingredients in order to maintain product or beverage quality.

In another embodiment, one or more product ingredient packages, such as 116A-116Q, may require agitation to keep the associated ingredient sufficiently mixed. In such instances, the location of such ingredients in an ingredient matrix, such as 108, can be limited to locations within the ingredient matrix, such as 108, that can be agitated as may be required and/or desired in a particular embodiment.

In another embodiment, ingredients from one or more of product ingredient packages, such as 116A-116Q, may be dispensed through antimicrobial-type tubing and/or dispenser parts. Such ingredients can include, but are not limited to, milk, dairy, soy, and/or other types and kinds of product ingredient packages. In these instances, the location of such ingredients in an ingredient matrix, such as 108, can be limited to locations within the ingredient matrix, such as 108, that utilize suitable antimicrobial-type tubing and/or dispenser parts as may be required and/or desired in a particular embodiment.

In yet another embodiment, a one-to-one relationship can be established between a particular product ingredient package, such as 116A, and at least one pump and/or valve, such as 120 and/or 122, respectively. In some instances, utilizing more than one pump and/or valve for a single product ingredient package, such as 116A, can draw a relatively higher volume of an ingredient from the package, such as 116A, in a relatively shorter period of time. For example, a product ingredient package containing a sweetener, such as sweetener 116P, may utilize more than one pump and/or valve to draw a relatively higher volume of an ingredient from the package 116P in a relatively shorter period of time.

Returning to FIG. 1, any number of other product dispensers, such as 102A-102N can also be in communication with the network, such as 104. In one embodiment, the communications network, such as 104 shown in FIG. 1, can be a local area network (LAN). In another embodiment, a communications network can be a wireless communications network capable of transmitting both voice and data signals, including image data signals or multimedia signals. Other networks can include, but are not limited to, Internet, a local area network (LAN), a wide area network (WAN), a LON WORKS network, a wired network, a wireless network, or any combination thereof.

The network, such as 104 of FIG. 1, is also shown in communication with at least one data processing resource, such as a server 126, and at least one database, such as 128A. In this embodiment, a server such as 126 can be a processor-based device capable of communicating with some or all of the product dispensers, such as 102A-102N, via the communications network, such as 104, by way of a signal, such as a wireless frequency signal or a direct wired communication signal. In addition, a data processing resource or server, such as 126, can be used to aid or facilitate recipes, formulations, methods of making products or beverages, provide operational data processing, perform data processing related to consumer interaction, and/or perform other data processing as may be required and or desired in a particular embodiment. Such operational data processing can include, for example and not as a limitation, equipment status, maintenance, service alerts, predictive restock, and/or other types and kinds or operational data processing as may be required and/or desired in a particular embodiment. Such consumer interaction support can include, for example and not as a limitation, consumer preferences, consumer product or beverage preferences, loyalty, gaming, prizes, media content, customizations, and/or other types and kinds of consumer interaction and/or data processing support as may be required and/or desired by a particular embodiment.

The server, such as 126 in FIG. 1, can include a processor, such as 130, and a computer-readable medium, such as a random access memory (RAM) 132, coupled to the processor 130. The processor, such as 130, can execute computer-executable program instructions stored in memory, such as 132. Computer executable program instructions stored in memory, such as 132, can include any number of module application programs, such as a consumer interaction engine or module similar to 114. The consumer interaction engine or module similar to 114 can be adapted to implement various methods for consumer-interaction. In addition, a consumer interaction engine or module similar to 114 can be adapted to interact with one or more consumers, and one or more servers or data processing resources. Other examples of functionality and aspects of embodiments of a consumer interaction engine or module similar to 114 are described below.

Through the network, such as 104 in FIG. 1, some or all of the product dispensers, such as 102A-102N, can retrieve, receive, or otherwise access information stored in some or all of the databases, such as a recipes, formulations, and methods of making products or beverages database, such as 128A, operational database, such as 128B, and consumer database, such as 128C. In any instance, one or more of the databases can include product or beverage formation information such as one or more product or beverage recipes, formulations, and methods of making products or beverages. Such product or beverage recipes, formulations, and methods of making products or beverages can include an ingredient list, the ratio of each ingredient, a listing of how a product or beverage can be customized by a consumer, and/or other types and kinds of product or beverage recipes, formulations, and methods of making a product or beverage as may be required and/or desired by a particular embodiment.

The example environment or system, such as 100 shown in FIG. 1, can facilitate customer, consumer, and user interaction with a product dispenser and network. For example and not as a limitation, a user such as a consumer can make a product type selection at a product dispenser, such as 102A, by way of an input/output device, such as display device 112. An associated processor or controller, such as 106, can facilitate a user's selection via display device, such as 112, of a particular recipe to form a selected product, such as a beverage. The processor or controller, such as 106, can display one or more products or beverages for selection via the display device, such as 112. The user may select at least one of the products or beverages using the display device, such as 112, for instance, pressing a button provided by or associated with the display device, such as 112. The processor or controller, such as 106, may obtain from a local memory, such as 110, or may communicate via a network, such as 104, with at least one database, or may communicate with at least one data processing resource, such as server 126, to obtain corresponding ingredients and/or ratio of ingredients for forming the selected product or beverage. The processor or controller, such as 106, can utilize the information to operate one or more pumps, such as 120, and/or valves, such as 122, to form and dispense a product or beverage by way of a nozzle, such as 124, into a cup or other container, such as 136.

In another example, a user such as a customer or package installation personnel can facilitate scanning or reading one or more product ingredient packages, such as 116A-116Q, when the packages 116A-116Q are inserted within an ingredient matrix, such as 108, associated with a product dispenser, such as 102A. A processor or controller, such as 106, associated with the product dispenser, such as 102A, can identify an optimum or selected location within the ingredient matrix, such as 108. The user, customer, or package installation personnel can be informed where a particular product ingredient package, such as 116A, is to be located in the ingredient matrix, such as 108, by way of an input/output device, such as display device, such as 112. An example of a display device can include, but is not limited to, a light emitting diode (LED) display indicator, LCD screen, input/output (I/O) interface, audio interface or other types and kinds of displays or indicators as may be required and/or desired in a particular embodiment.

In one embodiment, insertion of a particular product ingredient package, such as 116A, within an ingredient matrix, such as 108, can be checked or otherwise verified by scanning a machine readable code on the respective package, such as 116A, and scanning a machine readable code located on the ingredient matrix, such as 108, at the point of insertion (illustrated as 118A). In this regard, an associated processor or controller, such as 106, can check or verify that the product ingredient package, such as 116A, is correctly located within the ingredient matrix, such as 108.

In another embodiment, a cup, such as 136, or other container can include identification information, such as a RFID or other machine readable tag, such as 138, mounted to the cup as shown in FIG. 1. In some embodiments, identification information can be associated with a consumer by way of, for instance, RFID or other machine readable tag, similar to 138, embodied in or otherwise mounted to an icon or other object. A reader, such as a RFID or other machine readable code reader, such as 140, associated with a product dispenser, such as 102A, can receive or otherwise obtain the identification information from the RFID or other machine readable tag, similar to 138. As shown in FIG. 1, a processor or controller, such as 106, associated with the product dispenser, such as 102A, can be in communication with the RFID or other machine readable code reader, such as 140, and some or all identification information obtained from the RFID or other machine readable tag, such as 138, can be stored or otherwise processed by the processor or controller, such as 106. In this embodiment, the identification information can be embodied in a machine readable code, a bar code, RFID, radio frequency, infrared, or other wireless communication methods or devices, or other types and kinds of coding and/or storage technologies as may be required and/or desired in a particular embodiment. The RFID reader or machine readable code reader, such as 140, can be a corresponding device to read or receive the identification information from the RFID or other machine readable tag, such as 138, and can include a RFID read/write device, an infrared device, a magnetic card reader, a bar code reader, or other suitable reader or receiver technologies as may be required and/or desired in a particular embodiment.

In yet another embodiment, a server or transaction processing resource, such as 126, can facilitate a payment or payment processing when a consumer selects and attempts to pay for a product, such as a beverage, at a product dispenser, such as 102A. An associated processor or controller, such as 106, can receive the consumer's payment or related information by way of, for instance, a display device, such as 112, data transmission, or other input, before, during, or after the selection of the particular product or beverage. In any instance, the processor or controller, such as 106, can transmit the payment or related information to the server or transaction processing resource, such as 126, via a network, such as 104. The server or transaction processing resource, such as 126, may access least one database, such as 128A-128C, or may communicate with at least one other data processing resource to authorize or otherwise validate a payment or related information prior to accepting a payment from the consumer or otherwise dispensing the selected product or beverage to the consumer.

Figure 2:
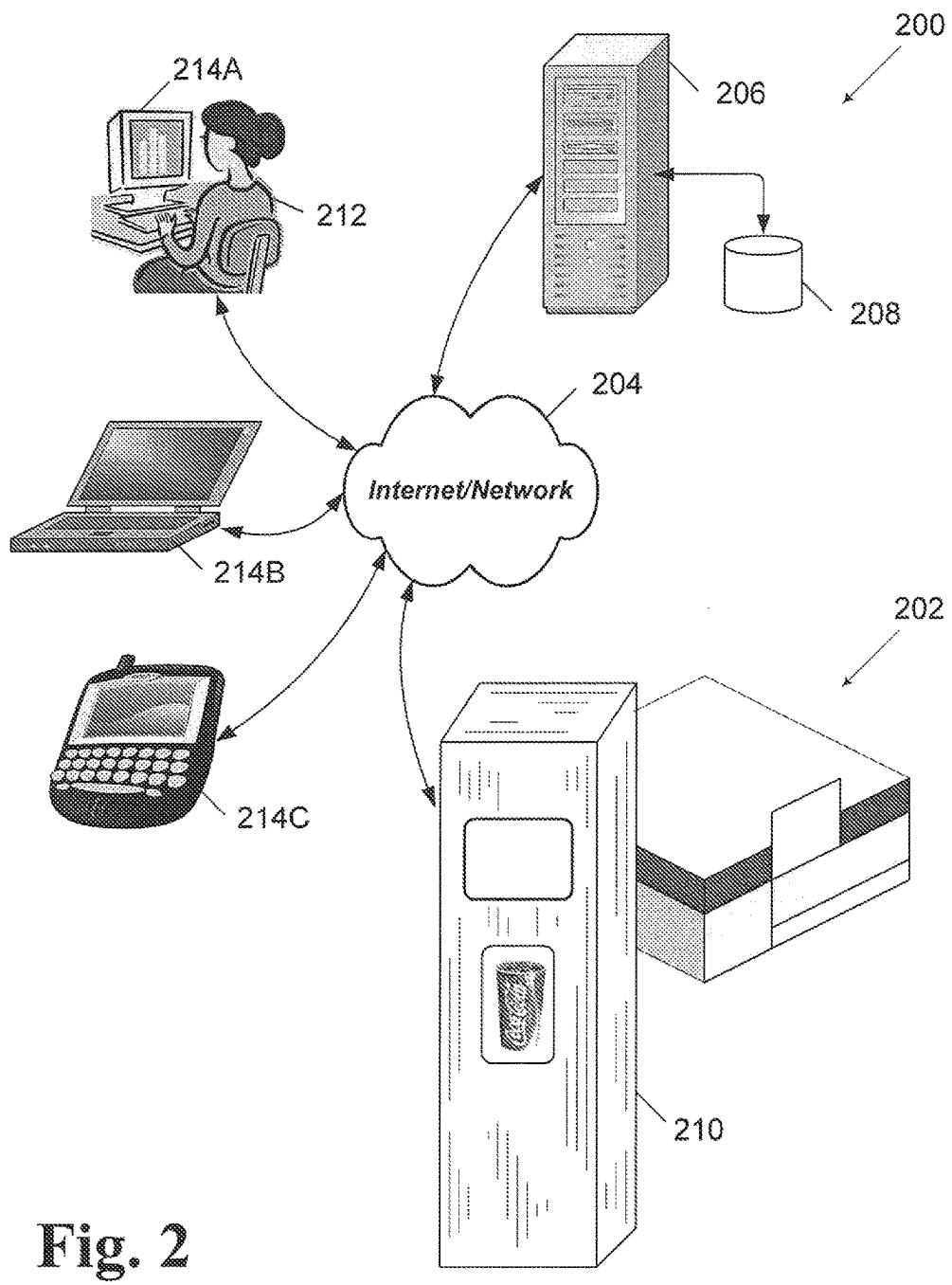
FIG. 2 illustrates one example of a consumer refreshment network in accordance with an embodiment of the invention.

Referring to FIG. 2, an example consumer refreshment environment or system 200 is illustrated. In one embodiment, one or more networked product dispensers, such as 210, can be installed in a plurality of respective locations, such as location 202, and can be in communication via a network 204, such as the Internet or a global network, with one or more servers or data processing resources, such as 206, and one or more data storage devices, such as database 208. By way of example, a product dispenser 210 can be similar to a beverage dispenser or dispenser apparatus, described as 102A in FIG. 1. In one example, a product dispenser, such as 210, can include some or all of the following components as described with respect to FIG. 1: an ingredient matrix, such as 108, with locations operable to receive one or more product ingredient packages, such as 116A-116Q, a controller, such as 106, one or more package insertion detection devices or RFID reader/writer, such as 118A-118Q, pumps, such as 120, valves, such as 122, and a nozzle, such as 124. By way of further example, servers or data processing resources 206 can be similar to server or data processing resource described as 126 in FIG. 1.

In one embodiment, one or more consumers, such as 212, can access a network, such as 104, or a consumer refreshment network, such as 204. Through the network 204, a consumer, such as 212, can sign up, configure consumer preferences, access respective accounts, receive promotions, manage loyalty accounts, and/or sign up for other types and kinds of opportunities and services as may be required and/or desired in a particular embodiment. In at least one embodiment, a consumer, such as 212, can choose to access a consumer refreshment network system, such as 200, and/or the product dispenser, such as 210, by way of any number of client-type devices including, but not limited to, a personal computer (PC), such as 214A, a data processing device, such as 214B, a wireless communication device, such as 214C, and/or by way of other types and kinds of data processing, processor-based, or client-type devices. An example of a wireless communication device 214C can include, but is not limited to, a wireless data processing device, a wireless phone, an IPHONE™, an IPOD™, a personal data assistant, and/or a POCKET PC™.

Figure 3:
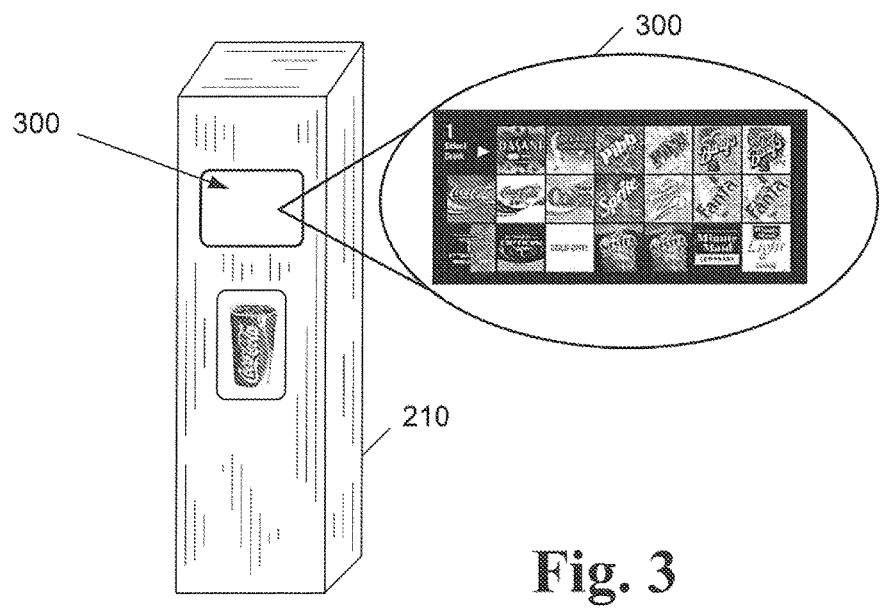
FIG. 3 illustrates one example of an enhanced view graphical user interface in accordance with an embodiment of the invention.

Referring to FIG. 3, an example of an enhanced view graphical user interface 300 is illustrated. In one embodiment, a product dispenser, such as 210 in FIG. 2, can include at least one user interface such as an enhanced view graphical user interface, such as 300, or a consumer interface. The user interface, such as 300, can be used, for instance, by a consumer, such as 212, to select any number of different product or beverage types, kinds, and formulations. In use, a product dispenser, such as 210, with an enhanced view graphical user interface, such as 300, can provide a consumer with selectable product or beverage options in a series of dynamically generated menus, wherein the consumer can locate and select a specific brand, kind, type, and/or formulation of a desired corresponding product or beverage. Once a particular product or beverage option is selected, the consumer can cause a corresponding product or beverage to be formulated and dispensed by the product dispenser.

Figure 4:
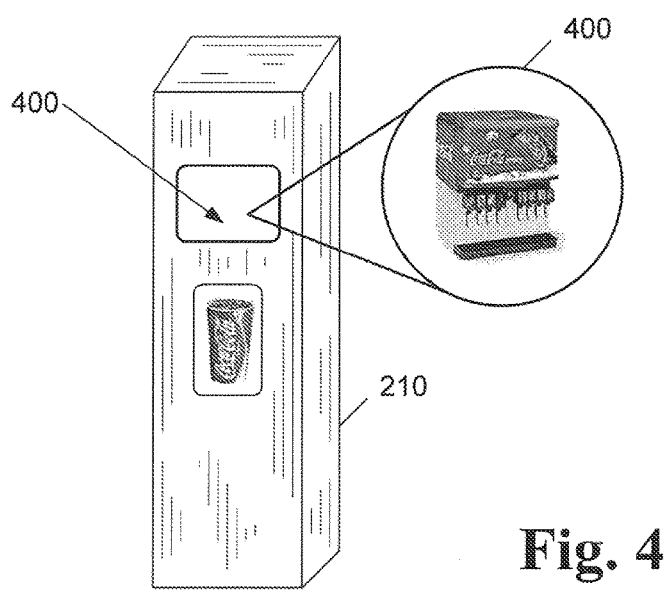
FIG. 4 illustrates one example of a classic view graphical user interface in accordance with an embodiment of the invention.

Referring to FIG. 4, another example of a user interface is shown. In one embodiment, a product dispenser, such as 210 in FIG. 2, can include a classic type graphical user interface, such as 400. The user interface, such as 400, can be used by a consumer, such as 212, to select from a limited number of different product or beverage types, kinds, and/or formulations. In use, a consumer, such as 212, can more easily select a product or beverage from a limited number of product or beverage choices. Once a particular product or beverage option is selected, the consumer can cause a corresponding product or beverage to be formulated and dispensed by the product dispenser. In some embodiments, a classic type graphical user interface can also be referred to as a traditional view as it generally resembles a traditional fountain dispensing valve design. As such, a classic type graphical user interface can be referred to as a traditional view graphical user interface.

In one embodiment, a consumer may desire fewer product or beverage choices than displayed by a product dispenser that allows the selection of, for instance, a plurality of different kinds of products or beverages. In such instances, a classic view graphical user interface with relatively fewer, more traditional product or beverage choices, and including one or more traditional-type product or beverage choices, can be displayed to facilitate, sometimes quicker, consumer interaction with the product dispenser.

In another embodiment, a consumer may elect to create consumer preferences that tailor the types and/or kinds of brands and/or product or beverage formulations displayed in a user interface, such as a classic view graphical user interface, essentially creating a consumer customized classic view graphical user interface. In this particular embodiment, a consumer can create a consumer customized classic view graphical user interface. For example, when a consumer identifies himself or herself to a product dispenser, such as 210, one or more consumer preferences can be retrieved by the dispenser 210. Based at least in part on one or more consumer preferences, the product dispenser 210 can display a default user interface to the consumer, which may be an enhanced view graphical user interface, a classic view graphical user interface, or a consumer customized classic view graphical user interface.

FIGS. 5-19 are example flowcharts for various methods in accordance with embodiments of the invention. Some or all of the illustrated methods can be implemented by a system, network, product dispenser, or any combination of associated components as shown in FIGS. 1-4.

Referring to FIG. 5, a method 500 for setting a product dispenser consumer interface is illustrated. In the embodiment shown in FIG. 5, a consumer can be identified and one or more consumer preferences retrieved locally and/or remotely from a server or data processing resource. A consumer interface associated with the product dispenser can be set or otherwise generated based at least in part on one or more consumer preferences.

The method 500 begins at 502, in which identification information associated with a consumer is received. In this embodiment, a product dispenser, such as 102A in FIG. 1, can receive or otherwise obtain identification information associated with a consumer. Based at least in part on the identification information, a processor or controller, such as 106 in FIG. 1, associated with the product dispenser, such as 102A, can identify the consumer. Such consumer identification can be by RFID tag, token, card, PIN, and/or by way of other types and kinds of identification devices or methods as may be required and/or desired in a particular embodiment.

Block 502 is followed by block 504, in which one or more consumer preferences are retrieved. In this embodiment, based at least in part on the identification information received from the consumer, one or more consumer preferences associated with the consumer or consumer information can be retrieved or otherwise received. In one embodiment, consumer preferences can be previously stored by a server or data processing resource, such as 126 in FIG. 1, either locally and/or remotely. A processor or controller, such as 106, associated with the product dispenser can retrieve or otherwise receive one or more consumer preferences from the server or data processing resource, such as 126.

Block 504 is followed by block 506, in which one or more consumer preferences are used to set default graphical user interface views. In this embodiment, a processor or controller, such as 106 in FIG. 1, can use one or more consumer preferences or consumer information received from the processor or controller, such as 106, to set or otherwise generate one or more default graphical user interface views. Such default graphical user interface views can include, but are not limited to, an enhanced view, a classic view, a customized classic view, and/or other types and/or kinds of views as may be required and/or desired in a particular embodiment.

The method 500 ends after block 506.

Referring to FIG. 6, another method 600 for setting a product dispenser consumer interface is illustrated. In the embodiment shown in FIG. 6, a consumer can data communicate with a product dispenser by way of a consumer data processing device and one or more consumer preferences can be retrieved locally and/or remotely from a server or data processing resource. A consumer interface associated with the product dispenser can be set or otherwise generated based at least in part on one or more consumer preferences. In this regard, such data communication can be used to select and/or customize the graphical user interface.

The method 600 begins at block 602, in which identification information is received from a client-type device or wireless communication device. In this embodiment, a client-type device associated with a consumer, such as 212A in FIG. 2, can communicate identification information associated with the consumer to a product dispenser, such as 102A in FIG. 1. A client-type device can be, for example, a wired or wireless data processing device that a consumer or a product cup associated with a consumer may interact with. The product dispenser, such as 102A, can receive data, such as identification information associated with a consumer.

Block 602 is followed by block 604, in which one or more consumer preferences are retrieved or otherwise determined.

In the embodiment shown, a processor or controller, such as 106 in FIG. 1, associated with the product dispenser 102A can transmit data to a local and/or remote server or data processing resource, such as 126. Based at least in part on the data, such as identification information, the server or data processing resource, such as 126, can retrieve or otherwise determine one or more consumer preferences or consumer information.

Block 604 is followed by block 606, in which one or more consumer preferences are used to set one or more default graphical user interface views. In this embodiment, a processor or controller, such as 106 in FIG. 1, can use one or more consumer preferences or consumer information received from the processor or controller, such as 106, to set or otherwise generate one or more default graphical user interface views. Such default graphical user interface views can include, but are not limited to, an enhanced view, such as 300, a classic view, such as 400, a customized classic view, and/or other types and/or kinds of views as may be required and/or desired in a particular embodiment.

The method 600 ends after block 606.

Figure 7:
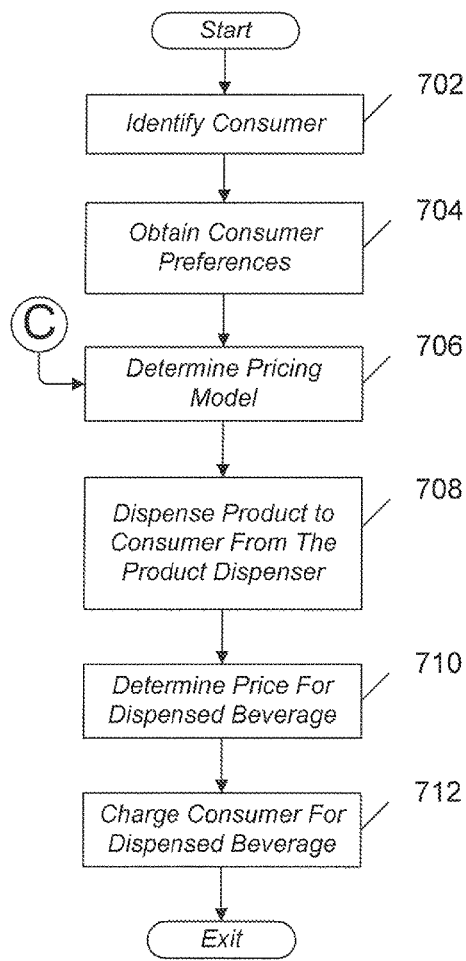
FIGS. 7-9 illustrate examples of methods of implementing differential pricing in accordance with an embodiment of the invention.
Figure 8:
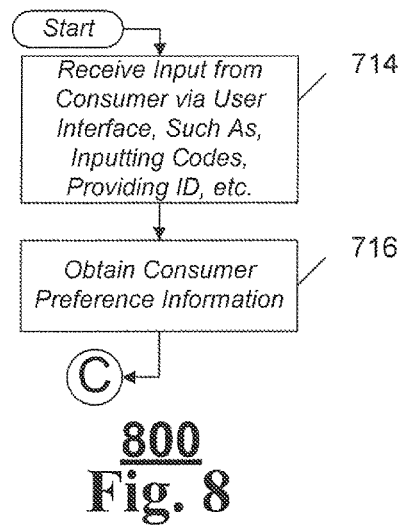
Figure 9:
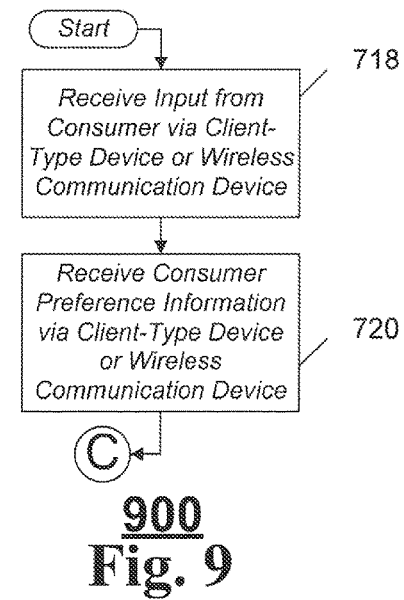

Referring to FIGS. 7-9, several example methods 700, 800, 900 of implementing differential pricing are illustrated. In the embodiment shown in FIG. 7, one or more consumer preferences or consumer information can be obtained prior to dispensing and/or charging for a dispensed product from the product dispenser. In this regard, the consumer preferences can be used in part to determine the price to charge for the dispensed product. Such consumer preferences or consumer information can be obtained by the product dispenser when the consumer identifies him or herself to the product dispenser. Alternatively, the consumer can enter a code or other type of unique identifier to be identified, grouped, and/or otherwise assigned a price for the dispensed product. Additionally, the consumer can data communicate with the product dispenser and such data communication can in part determine the price to charge the consumer for the dispensed product.

The method 700 begins in at block 702. In block 702, a consumer is identified. In this embodiment, a product dispenser, such as 102A in FIG. 1, can receive or otherwise obtain identification information associated with a consumer. Based at least in part on the identification information, a processor or controller, such as 106, associated with the product dispenser, such as 102A, can identify the consumer. Identification information can be provided by RFID tag, token, card, PIN, and/or by way of other types and kinds of identification methods as may be required and/or desired in a particular embodiment.

Block 702 is followed by block 704, in which one or more consumer preferences are obtained. In this embodiment, based at least in part on the identification information associated with the consumer, one or more consumer preferences associated with the consumer or consumer information can be obtained or otherwise received. In one embodiment, consumer preferences can be previously stored by a server or data processing resource, such as 126 in FIG. 1, either locally and/or remotely. A processor or controller, such as 106, associated with the product dispenser can obtain or otherwise receive one or more consumer preferences or consumer information from the server or data processing resource, such as 126, as may be required and/or desired in a particular embodiment.

Block 704 is followed by block 706, in which at least one pricing model is determined. In this embodiment, based at least in part on one or more consumer preferences, at least one pricing model can be determined or otherwise selected by a processor or a controller, such as 106, associated with the product dispenser, such as 102A. In one embodiment, a pricing model can be stored in a data storage device associated with a server or data processing resource, such as 126. A pricing model can determine what a consumer may be charged for a dispensed product. Such a model may charge the same for all dispensed products, and/or may charge different prices for different types and/or kinds of products, and/or charge different prices for different volumes of product dispensed.

Block 706 is followed by block 708, in which a product is dispensed to the consumer from the product dispenser. In this embodiment, the product dispenser can proceed to dispense at least one product, such as a beverage, to the consumer. For example, a product such as a beverage can be dispensed via a nozzle associated with a product dispenser, such as nozzle 124, of product dispenser, such as 102A. In other embodiments, other product configurations can be dispensed, such as cans, bottles, and wrapped or otherwise packaged products.

Block 708 is followed by block 710, in which a price is determined for the dispensed product. In this embodiment, a processor or controller, such as 106, associated with the product dispenser, such as 102A, can determine a price for the dispensed product or beverage based at least in part on the at least one pricing model. In some instances, a pricing model may have more than one price for a particular product or beverage, and additional data such as consumer preferences, identification information, volume, and type of product may be used to determine a price.

Block 710 is followed by block 712, in which the consumer is charged for the dispensed product. In this embodiment, a processor or controller, such as 106, associated with the product dispenser, such as 102A, can charge the consumer for the dispensed product or beverage. For example, a processor or controller, such as 106, associated with the product dispenser, such as 102A, can charge or otherwise debit an account associated with the consumer. In another example, a processor or controller, such as 106, associated with the product dispenser, such as 102A, can facilitate a payment from a consumer via a user interface associated with a payment transaction device.

The method 700 ends at block 712.

Referring to FIG. 8, another method 800 for implementing differential pricing is illustrated. In this embodiment, a consumer can interact with a graphical user interface associated with a product dispenser. The consumer can input codes and/or other types and/or kinds of identification, as may be required and/or desired in a particular embodiment. Such codes or identification can be for promotional pricing and/or for other purposes.

The method 800 begins at block 714. In block 714, a consumer interacts with a user interface associated with a product dispenser and inputs codes and/or other types of identification information. In this embodiment, a consumer can interact with a user interface, such as 112 in FIG. 1, associated with a product dispenser, such as 102A, to input codes and/or other types or kinds of identification information.

Block 714 is followed by block 716, in which one or more consumer preferences are obtained. In this embodiment, based at least in part on some or all of the codes and identification information input by the consumer, one or more consumer preferences associated with the consumer or consumer information can be obtained or otherwise received. In one embodiment, consumer preferences or consumer information can be previously stored by a server or data processing resource, such as 126 in FIG. 1, either locally and/or remotely. A processor or controller, such as 106, associated with the product dispenser can obtain or otherwise receive one or more consumer preferences or consumer information from the server or data processing resource, such as 126, as may be required and/or desired in a particular embodiment.

Block 716 is followed by block 706 as described above with respect to FIG. 7. The method 800 can continue as described above in FIG. 7.

Referring to FIG. 9, another method 900 for implementing differential pricing is illustrated. In this embodiment, a consumer may data communicate with a product dispenser. Such data communication can be utilized to identify the consumer, determine promotional information, and/or otherwise aid in determining one or more consumer preferences, promotional preferences, and/or other types and/or kinds of preferences.

The method 900 begins at block 718, in which a consumer uses a client-type or wireless communication device to activate a product dispenser. In this embodiment, a consumer can interact with a client-type device, such as 214A-214C in FIG. 2. Examples of a client-type device can include, but are not limited to, wireless communication devices, wireless devices, a wireless phones, an IPOD™, IPHONE™, a POCKET PC™, and other wireless communication devices. In any instance, the consumer can operate the client-type device, such as 214A-214C, which can send a signal to an adjacent product dispenser. In this instance, the product dispenser can be activated, or otherwise be set to a relatively higher status, in preparation for interaction with the consumer or the client-type or wireless communication device.

Block 718 is followed by block 720, in which one or more consumer preferences are communicated by the consumer to the product dispenser via the client-type or wireless communication device. In this embodiment, consumer preferences, such as those input by the consumer or previously stored information, can be transmitted from the client-type or wireless communication device, such as 214A-214C, to the product dispenser, such as 102A in FIG. 1.

Block 718 is followed by block 706 as described above with respect to FIG. 7. The method 900 can continue as described above in FIG. 7.

Referring to FIG. 10, an example method 1000 for interacting with a product dispenser is provided. In the embodiment shown, a consumer can interact with a product dispenser using a client-type or wireless communication device, such as a wireless communication device, a wireless phone, an IPOD™, IPHONE™, a POCKET PC™, and/or other types and/or kinds of wireless data processing device that can communicate with a product dispenser. In this regard, one or more consumer preferences can be stored on and retrieved from a client-type device associated with a consumer.

In one embodiment, a consumer can use his or her client-type or wireless communication device to buy a friend products, exchange recipes, and receive promotional content.

The method 1000 begins in block 1002. In block 1002, an input from a consumer is received via a client-type device, such as 214A-214C in FIG. 2. In this embodiment, a client-type or wireless communication device associated with a consumer, such as 214A-214C, can communicate data to a product dispenser, such as 102A in FIG. 1. A client-type device can be, for example, a wireless communication device, a wireless device, a wireless phone, an IPOD™, IPHONE™, a POCKET PC™, and/or other types and/or kinds of wireless processing device that can communicate with a product dispenser. The product dispenser, such as 102A, can receive data, such as identification information associated with a consumer, from the client-type or wireless communication device.

Block 1002 is followed by decision block 1004, in which a determination is made whether to store consumer preferences on the client-type or wireless communication device. If the determination is in the affirmative, that is, a consumer wants to store one or more consumer preferences on the client-type or wireless communication device, the method 1000 continues to block 1006. If the determination is in the negative, that is, a consumer does not want to store one or more consumer preferences on the client-type or wireless communication device, then the method 1000 continues to block 1008. In this embodiment, a consumer can make a decision to store one or more consumer preferences on a client-type or wireless communication device, such as 214A-214C. For example, a client-type or wireless communication device, such as 214A-214C, can include an option to store one or more consumer preferences in a data storage device, such as a memory associated with the client-type or wireless communication device.

At block 1006, consumer preferences are stored on the client-type or wireless communication device. In this embodiment, a client-type or wireless communication device, such as 214A-214C, can receive a consumer instruction to store one or more consumer preferences, and the client-type or wireless communication device, such as 214A-214C, can store the one or more consumer preferences in a data storage device, such as a memory, associated with the client-type or wireless communication device. In other embodiments, a client-type or wireless communication device can store one or more consumer preferences in a data storage device accessible via a network, such as a database in communication with the client-type or wireless communication device via a network.

Block 1006 is followed by decision block 1008, in which a determination is made as to whether the consumer wants to retrieve consumer preferences from the client-type or wireless communication device. If the determination is in the affirmative, that is, a consumer wants to retrieve one or more consumer preferences from a client-type or wireless communication device, such as 214A-214C, then the method 1000 continues at block 1010. If the determination is in the negative, that is, the consumer does not want to retrieve one or more consumer preferences from the client-type or wireless communication device, such as 214A-214C, then the method 1000 continues to decision block 1012. In this embodiment, a consumer can determine whether to provide access to one or more consumer preferences stored on a client-type or wireless communication device. For example, a client-type or wireless communication device can provide a prompt to a consumer, and the consumer can provide an instruction via an input device associated with a client-type or wireless communication device, such as a keypad associated with a client-type or wireless communication device, such as 214A-214C. In another example, a client-type or wireless communication device can provide a prompt to a consumer, and a consumer can provide an instruction, such as a voice instruction, via an input device, such as a microphone, associated with a client-type or wireless communication device, such as 214A-214C. In any event, a controller or processor associated with the wireless communicating device can receive the instruction and access one or more consumer preferences can be provided if the consumer desires.

In block 1010, product preferences are retrieved from the client-type device or wireless communication device. In this embodiment, one or more product preferences can be retrieved from a data storage device associated with the client-type device or wireless communication device, or from a data storage device accessible via a network, after the client-type device or wireless communication device receives an instruction from a consumer. For example, a processor or controller associated with a client-type device or wireless communication device, such as 214A-214C, can receive an instruction from a consumer to provide access, and the controller can retrieve one or more product preferences stored in an associated data storage device, such as a memory.

Block 1010 is followed by decision block 1012, in which a determination is made whether the consumer wants to send product preferences to an entity, such as a friend. If the determination is in the affirmative, that is, the consumer wants to send product preferences to an entity, such as a friend, then the method 1000 continues at block 1014. If the determination is in the negative, that is, the consumer does not want to send product preferences to an entity, such as a friend, then the method 1000 continues to decision block 1016. In this embodiment, a consumer can determine whether to provide one or more product preferences to an entity, such as a friend. For example, a client-type device or wireless communication device can provide a prompt to a consumer, and the consumer can provide an instruction to provide one or more product preferences to an entity, such as a friend. The instructions can be transmitted via an input device associated with a client-type device or wireless communication device, such as a keypad associated with a client-type device or wireless communication device, such as 214A-214C. In another example, a client-type device or wireless communication device can provide a prompt to a consumer, and a consumer can provide an instruction, such as a voice instruction, to provide one or more product preferences to an entity, such as a friend. The instructions can be transmitted via an input device, such as a microphone, associated with a client-type device or wireless communication device, such as 214A-214C. In any event, a controller or processor associated with the client-type device or wireless communication device can receive the instruction from the consumer to provide one or more product preferences to an entity, such as a friend, if the consumer desires.

In block 1014, product preferences are sent to an entity, such as a friend. In this embodiment, a client-type device or wireless communication device can transmit one or more product preferences to an entity, such as a friend, via a network. For example, a client-type device or wireless communication device, such as 214A-214C in FIG. 2, can transmit via a network, such as 104 in FIG. 1, one or more product preferences to a client-type device or wireless communication device associated with an entity, such as a client-type device or wireless communication device associated with a friend.

Block 1014 is followed by block 1016, in which a determination is made as to whether the consumer wants to buy an entity, such as friend, a product. If the determination is in the affirmative, that is, a consumer wants to buy an entity, such as a friend, a product or beverage, then the method 1000 continues at block 1018. If the determination is in the negative, that is, a consumer does not want to buy an entity, such as a friend, a product or beverage, then the method 1000 continues at decision block 1020. In this embodiment, a consumer can determine whether to buy an entity, such as a friend, a product or beverage. For example, a client-type device or wireless communication device can provide a prompt to a consumer, and the consumer can provide an instruction to buy or purchase a product or beverage for an entity, such as a friend. The instructions can be transmitted via an input device associated with a client-type device or wireless communication device, such as a keypad associated with a client-type device or wireless communication device, such as 214A-214C. In another example, a client-type device or wireless communication device can provide a prompt to a consumer, and a consumer can provide an instruction, such as a voice instruction, to buy or purchase a product or beverage for an entity, such as a friend. The instructions can be transmitted via an input device, such as a microphone, associated with a client-type device or wireless communication device, such as 214A-214C. In any event, a controller or processor associated with the client-type device or wireless communication device can receive the instruction from the consumer to buy or purchase a product or beverage for an entity, such as a friend, if the consumer desires.

Decision block 1016 is followed by block 1018, a product is purchased for an entity, such as a friend. In this embodiment, a consumer can facilitate buying or purchasing a product or beverage for an entity, such as a friend, via a client-type device or wireless communication device, such as 214A-214C. For example, a client-type device or wireless communicating device, such as 214A-214C, can facilitate the purchase of a product or beverage for a consumer on behalf of an entity, such as friend, by transmitting one or more purchase instructions to a product dispenser, such as 102A.

Block 1018 is followed by decision block 1020, in which a determination is made whether the client-type device or wireless communication device, such as 214A-214C, is receiving promotional content from the product dispenser. If the determination is in the affirmative, that is, the client-type device or wireless communication device, such as 214A-214C, is receiving promotional content from the product dispenser, then the method 1000 continues at block 1022. If the determination is in the negative, that is, the client-type device or wireless communication device, such as 214A-214C, is not receiving promotional content from the product dispenser, then the method 1000 continues at decision block 1024. In this embodiment, a processor or controller associated with a client-type device or wireless communication device, such as 214A-214C in FIG. 2, can determine whether promotional content is received from a product dispenser, such as 102A in FIG. 1, or from remote location, such as a server or data processing resource, such as 126.

Decision block 1020 is followed by block 1022, in which promotional content is received and optionally displayed. In this embodiment, promotional content can be transmitted from a product dispenser, such as 102A, and optionally displayed by the client-type device or wireless communication device, such as 214A-214C, and/or the product dispenser, such as 102A.

Block 1022 is followed by decision block 1024, in which, a determination is made whether the consumer is to be sent a survey. If the determination is in the affirmative, that is, the consumer is to be sent a survey, then the method 1000 continues at block 1026. If the determination is in the negative, that is, the consumer is not to be sent a survey, then the method 1000 ends. In this embodiment, a processor or controller associated with a product device, such as controller 106 in FIG. 1, can determine whether to send a survey to the consumer. In one embodiment, a server or data processing resource, such as 126, can determine whether to send a survey to the consumer.

Decision block 1024 is followed by block 1026, in which a survey is received by a consumer. In this embodiment, a survey can be sent to a consumer by a processor or controller associated with a product device, such as controller 106 in FIG. 1. The survey can be displayed on a user interface associated with a client-type device or wireless communication device, such as 214A-214C in FIG. 2. In one embodiment, a survey can be displayed on a user interface associated with a product dispenser, such as user interface 112 in FIG. 1.

Block 1026 is followed by block 1028, in which an input to the survey is received from the consumer. In this embodiment, a survey displayed on a user interface associated with a client-type device or wireless communication device, such as 214A-214C in FIG. 2, can be completed or otherwise filled in by the consumer using an associated keypad or other input device. In one embodiment, a survey displayed on a user interface associated with a product dispenser can be completed or otherwise filled in by the consumer using an associated input device, such as a keyboard, or input pad.

Block 1028 is followed by block 1030, in which survey inputs are transmitted to a data processing resource. In this embodiment, a consumer can initiate sending some or all inputs to a survey to a server or data processing resource, such as 126 in FIG. 1, for storage and subsequent processing and retrieval. After block 1030, the method 1000 ends.

Referring to FIG. 11, an example method 1100 of providing a loyalty reward based in part on whether a product is dispensed. In this embodiment, a consumer can receive a loyalty reward, such as a trademark loyalty reward, each time he or she frequents a product dispenser. In this regard, the consumer can receive a trademark loyalty reward without having to purchase a product from the product dispenser. When the consumer elects to purchase a product from the product dispenser, the consumer can receive a product loyalty reward.

The method 1100 begins at block 1102, in which a consumer is identified by a product dispenser. In this embodiment, a product dispenser, such as 102A in FIG. 1, can receive or otherwise obtain identification information associated with a consumer. Based at least in part on the identification information, a processor or controller, such as 106, associated with the product dispenser, such as 102A, can identify the consumer. Identification information can be provided by RFID tag, token, card, PIN, and/or by way of other types and kinds of identification methods as may be required and/or desired in a particular embodiment. For example, a consumer can be associated with a wireless communicating device, such as 214A-214C in FIG. 2, which may communicate identification information to a product dispenser when the consumer approaches the dispenser.

Block 1102 is followed by block 1104, in which a trademark loyalty reward is allocated to the consumer via a client-type device or a wireless communication device. In this embodiment, when a client-type device or wireless communication device, such as 214A-214C in FIG. 2, is in proximity to a product dispenser, the wireless communication device, such as 214A-214C, and the product dispenser can communicate via wireless communications. A trademark loyalty reward can be credited to or otherwise obtained by the consumer without purchase of a product or beverage from the product dispenser. This type of loyalty reward can be referred to as a "trademark loyalty reward" since a beverage or product was not dispensed or otherwise purchased from the product dispenser.

Block 1104 is followed by decision block 1106, in which a determination is made whether the consumer dispensed a product. If the determination is in the affirmative, that is, the consumer dispenses a product, then the method 1100 continues to block 1108. If the determination is in the negative, that is, the consumer does not dispense a product, then the method 1100 ends. In this embodiment, a processor or controller associated with a product dispenser, such as 102A in FIG. 1, can determine whether a consumer dispenses a product from the product dispenser, such as 102A.

In block 1108, a product loyalty reward can be allocated to the consumer via a client-type or wireless communication device. In this embodiment, a client-type device or wireless communication device, such as 214A-214C, can facilitate acquiring a loyalty reward by the consumer. For example, the wireless communication device, such as 214A-214C, can store a product loyalty reward or otherwise credit an account associated with the consumer. In this instance, the loyalty reward can be considered a "product loyalty reward" since a product was dispensed to the consumer. Such a loyalty reward can be referred to as a "product loyalty reward" and can be tailored based in part on the type and/or kind of product or beverage dispensed.

The method 1100 ends after block 1108.

Referring to FIGS. 12-13, example methods 1200, 1300 of implementing a frequent drinks program to earn free or discounted drinks are described.

In the embodiment shown in FIG. 12, a frequent drinks program enables consumers to acquire frequent drink rewards and then redeem such rewards for free products dispensed from a product dispenser.

Method 1200 begins at block 1202. In block 1202, a consumer is identified by a product dispenser. In this embodiment, a product dispenser, such as 102A in FIG. 1, can receive or otherwise obtain identification information associated with a consumer. Based at least in part on the identification information, a processor or controller, such as 106, associated with the product dispenser, such as 102A, can identify the consumer. Such consumer identification can be by RFID, token, card, loyalty card, personal identification code, PIN, a consumer wireless data processing device, and/or by way of other types and kinds of identification devices or methods as may be required and/or desired in a particular embodiment.

Block 1202 is followed by block 1204, in which the product dispenser tracks one or more products or beverages dispensed by the consumer. In this embodiment, a product dispenser, such as 102A in FIG. 1, can generate information associated with one or more products or beverages dispensed to or by a consumer. Based at least in part on the information associated with one or more products or beverages dispensed to or by a consumer, a processor or controller, such as 106, associated with the product dispenser, such as 102A, can store the information in an associated memory or other data storage device, such as 110 in FIG. 1. In this manner, one or more products or beverages dispensed to or by a consumer can be tracked by the product dispenser.

Block 1204 is followed by block 1206, in which a frequent drinks reward is assigned to the consumer based at least in part on the product or beverage type, kind, and/or quantity of product or beverage dispensed. Based at least in part on the product or beverage type, kind, and/or quantity of product or beverage dispensed to or by a consumer, a processor or controller, such as 106 in FIG. 1, associated with the product dispenser, such as 102A, can determine a reward, such as a frequent drinks reward, to assign to the consumer.

Block 1206 is followed by block 1208, in which the frequent drinks reward is posted to a consumer selected account. In the embodiment shown, a processor or controller, such as 106 in FIG. 1, associated with the product dispenser, such as 102A, can transmit reward data to a local and/or remote server or data processing resource, such as 126. The local and/or remote server or data processing resource, such as 126, can store data associated with a frequent drinks reward or other reward data in an account previously selected or otherwise designated by the consumer. In one embodiment, an account can be generated for a consumer, and stored in a memory associated with the local and/or remote server or data processing resource, such as 126, or other data storage device, such as 110. Prior to a reward being posted to the account, the consumer can select or otherwise designate the account to receive a reward. For example, a processor or controller, such as 126, associated with the product dispenser, such as 102A, can provide an option to a consumer via a user interface, such as 112, to select or otherwise designate an account to receive a reward. In another example, a local and/or remote server or data processing resource, such as 126, can provide an option to a consumer via a client-type device, such as 214A-214C in FIG. 2, to select or otherwise designate an account to receive a reward. In any instance, a consumer input regarding a selected account to receive an award can be stored in a memory associated with the local and/or remote server or data processing resource.

The method 1200 ends after block 1208.

FIG. 13 illustrates another method 1300 of implementing a frequent drinks program to earn free or discounted drinks. In the embodiment shown in FIG. 13, the consumer can receive printed reward codes, and/or other types and kinds of codes that the consumer can later enter online to add rewards to a frequent drinks account. In this regard, the consumer may receive data at the product dispenser, and may enter the data at a website, such as MYCOKEREWARDS.COM, to be credited with a frequent drinks reward.

Method 1300 shown in FIG. 13, begins at block 1302. In block 1310, a consumer is identified by a product dispenser. In this embodiment, a product dispenser, such as 102A in FIG. 1, can receive or otherwise obtain identification information associated with a consumer. Based at least in part on the identification information, a processor or controller, such as 126, associated with the product dispenser, such as 102A, can identify the consumer. Such consumer identification can be by RFID, token, card, loyalty card, personal identification code, PIN, a consumer wireless data processing device, and/or by way of other types and kinds of identification devices or methods as may be required and/or desired in a particular embodiment.

Block 1302 is followed by block 1304, in which the product dispenser tracks the products or beverages dispensed by the consumer. In this embodiment, a product dispenser, such as 102A in FIG. 1, can generate information associated with one or more products or beverages dispensed to or by a consumer. Based at least in part on the information associated with one or more products or beverages dispensed to or by a consumer, a processor or controller, such as 126, associated with the product dispenser, such as 102A, can store the information in an associated memory or other data storage device, such as 110.

In this manner, one or more product or beverages dispensed to or by a consumer can be tracked by the product dispenser.

Block 1304 is followed by block 1306, in which a frequent drinks reward is assigned to the consumer based at least in part on the product or beverage type, kind, and/or quantity of product or beverage dispensed. Based at least in part on the product or beverage type, kind, and/or quantity of product or beverage dispensed to or by a consumer, a processor or controller, such as 126 in FIG. 1, associated with the product dispenser such as 102A, can determine a reward, such as a frequent drinks reward, to assign to the consumer.

Block 1306 is followed by block 1308, in which a reward code is printed and/or otherwise communicated to the consumer. In the embodiment shown, a processor or controller, such as 126 in FIG. 1, associated with the product dispenser such as 102A, can generate or otherwise receive a reward code for transmission to the consumer. The processor or controller, such as 126, can provide the reward code to the consumer via an output device, such as a printer, such as 134, or a user interface, such as 112. In another embodiment, a local and/or remote server or data processing resource, such as 126, can generate a reward code and transmit the reward code to the product dispenser such as 102A, for communication to the consumer. In yet another embodiment, a local and/or remote server or data processing resource, such as 126, can generate a reward code and transmit the reward code to a client-type device, such as 214A-214C in FIG. 2, via a network, such as 104, for receipt by a consumer. In any instance, a reward code is printed and/or otherwise communicated to the consumer.

Block 1308 is followed by block 1310, in which the consumer is allowed to enter the reward code online to post the frequent drinks rewards to his or her account. In the embodiment shown, a consumer can utilize a client-type device, such as 214A-214C in FIG. 2, to gain online access to a website, webpage, or other online location at a later date, time, and/or location of the consumer's choosing. In another embodiment, a consumer can utilize a product dispenser to access a website, webpage, or other online location at a later date, time, and/or location of the consumer's choosing. In any instance, the consumer can enter a reward code online via a website, webpage, or other online location. A local and/or remote server or data processing resource, such as 126 in FIG. 1, can receive the reward code, and the server or data processing resource, such as 126, can post a reward, such as a frequent drinks reward, to his or her account. The local and/or remote server or data processing resource, such as 126, can store data associated with a frequent drinks reward or other reward data in an account previously selected or otherwise designated by the consumer. In one embodiment, an account can be generated for a consumer, and stored in a memory associated with the local and/or remote server or data processing resource, such as 126, or other data storage device, such as 110. Prior to a reward being posted to the account, the consumer can select or otherwise designate the account to receive a reward. For example, a processor or controller, such as 106, associated with the product dispenser, such as 102A, can provide an option to a consumer via a user interface, such as 112, to select or otherwise designate an account to receive a reward. In another example, a local and/or remote server or data processing resource, such as 126, can provide an option to a consumer via a client-type device, such as 214A-214C, to select or otherwise designate an account to receive a reward. In any instance, a consumer input regarding a selected account to receive an award can be stored in a memory associated with the local and/or remote server or data processing resource, such as 126, or other data storage device, such as 110.

The method 1300 ends after block 1310.

Figure 14:
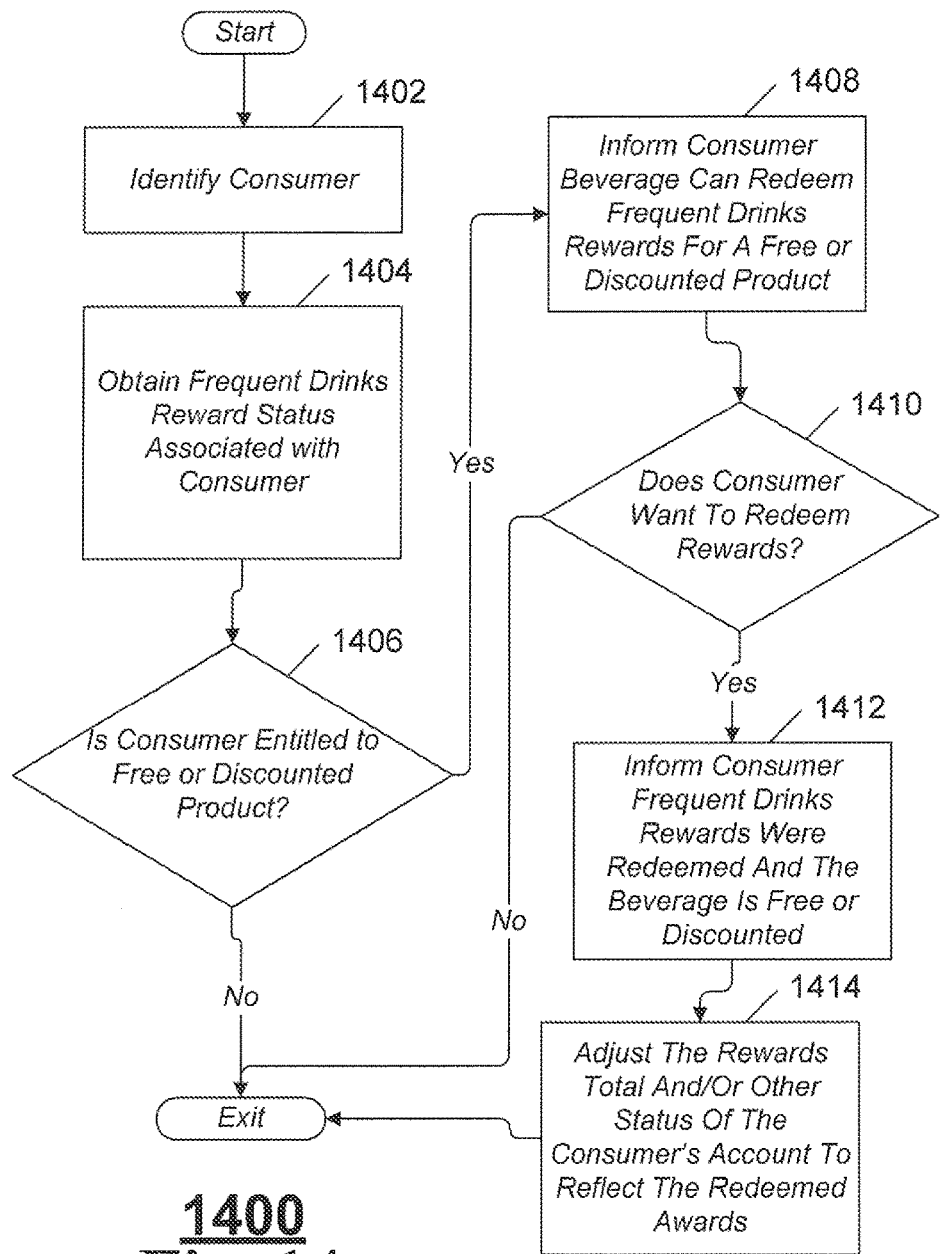

FIG. 14 illustrates another method 1400 of implementing a frequent drinks program to earn free or discounted drinks. In the embodiment shown in FIG. 14, a consumer can redeem frequent drinks rewards at a product dispenser.

Method 1400 shown in FIG. 14, begins at block 1402. In block 1420, a consumer is identified by a product dispenser. In this embodiment, a product dispenser, such as 102A in FIG. 1, can receive or otherwise obtain identification information associated with a consumer. Based at least in part on the identification information, a processor or controller, such as 106, associated with the product dispenser, such as 102A, can identify the consumer. Such consumer identification can be by RFID, token, card, loyalty card, personal identification code, PIN, a consumer wireless data processing device, and/or by way of other types and kinds of identification devices or methods as may be required and/or desired in a particular embodiment.

Block 1402 is followed by block 1404, in which the product dispenser can data communicate locally and/or remotely with a data processing resource to obtain the consumer's frequent drinks reward status. In the embodiment shown, a processor or controller, such as 106 in FIG. 1, associated with the product dispenser, such as 102A, can transmit identification data to a local and/or remote server or data processing resource, such as 126. Based at least in part on the identification data, the local and/or remote server or data processing resource, such as 126, can obtain or otherwise locate a frequent drinks reward status or account associated with the consumer. In one embodiment, a processor or controller, such as 106, may access an associated memory or data storage device, such as 110, to obtain or otherwise locate a frequent drinks reward status or account associated with the consumer.

In one embodiment, prior to a reward status being obtained for any account, the consumer can select or otherwise designate an account to receive and redeem rewards. For example, a processor or controller, such as 106 in FIG. 1, associated with the product dispenser, such as 102A, can provide an option to a consumer via a user interface, such as 112, to select or otherwise designate an account to receive and redeem rewards. In another example, a local and/or remote server or data processing resource, such as 126, can provide an option to a consumer via a client-type device, such as 214A-214C in FIG. 2, to select or otherwise designate an account to receive a reward. In any instance, a consumer input regarding a selected account to receive an award can be stored in a memory associated with the local and/or remote server or data processing resource, such as 126, or other data storage device, such as 110.

Block 1404 is followed by decision block 1406, in which a determination is made as to whether the consumer has sufficient rewards for a free or discounted product or beverage. If the determination is in the affirmative, that is, the consumer has sufficient rewards for a free or discounted product or beverage, then the method 1400 continues at block 1408. If the determination is in the negative, that is, the consumer does not have sufficient rewards for a free or discounted product or beverage, then the method 1400 ends. In the embodiment shown, a local and/or remote server or data processing resource, such as 126 in FIG. 1, can determine whether sufficient rewards for a free or discounted product or beverage exist in an account associated with the consumer. For example, the local and/or remote server or data processing resource, such as 126, can compare a threshold amount corresponding to a free or discounted product or beverage with an amount of rewards in the account. Based at least in part on the comparison, the local and/or remote server or data processing resource, such as 126, can determine whether the account associated with the consumer has sufficient rewards for a free or discounted product or beverage.

In block 1408, the consumer is informed that he or she can redeem frequent drinks rewards for a free or discounted product or beverage. In the embodiment shown, a processor or controller, such as 106 in FIG. 1, associated with the product dispenser, such as 102A, can generate or otherwise transmit a communication to the consumer that he or she can redeem frequent drinks rewards for a free or discounted product or beverage. In another embodiment, a local and/or remote server or data processing resource, such as 126, can generate a communication or other output, such as a message, and transmit the message to the product dispenser, such as 102A, for communication to the consumer. The processor or controller, such as 106, associated with the product dispenser, such as 102A, can receive the message for communication to the consumer. In any instance, a processor or controller, such as 106, associated with the product dispenser, such as 102A, can provide the message to the consumer via an output device, such as a user interface, for instance 112.

Block 1408 is followed by decision block 1410, in which a determination is made as to whether the consumer wants to redeem the rewards for a free or discounted product or beverage. If the determination is in the affirmative, that is, the consumer wants to redeem the rewards for a free or discounted product or beverage, then the method 1400 continues at block 1412. If the determination is in the negative, that is, the consumer does not want to redeem the rewards for a free or discounted product or beverage, then the method 1400 ends. In the embodiment shown in FIG. 14, a processor or controller, such as 106 in FIG. 1, associated with the product dispenser, such as 102A, can determine whether the consumer wants to redeem the rewards for a free or discounted product or beverage. For example, the processor or controller, such as 106, can receive a consumer input or selection via a user interface, such as 112, and determine whether the input or selection corresponds to whether the consumer wants to redeem the rewards or does not want to redeem the rewards.

In block 1412, the consumer is informed that the frequent drinks rewards have been redeemed, and that this product or beverage cost is free or otherwise discounted. In this embodiment, information associated informing the consumer can be sent to the consumer by a processor or controller associated with a product device, such as controller 106 in FIG. 1. The information associated with informing the consumer can be displayed on a user interface associated with a product dispenser, such as 102A.

Block 1412 is followed by block 1414, in which the frequent drinks rewards total and/or the status of the account to reflect any redemption of rewards. In the embodiment shown, the processor or controller associated with a product device, such as controller 106 in FIG. 1, can communicate with the local and/or remote server or data processing resource, such as 126, to adjust the rewards total, such as a frequent drinks reward, in the consumer's account. Furthermore, the local and/or remote server or data processing resource, such as 126, may change the status of the account depending on whether there is sufficient rewards total in the account for current or future reward redemptions.

The method 1400 ends after block 1414.

Referring to FIGS. 15-16, example methods 1500, 1600 of using consumer preferences to customize user interface skinning are illustrated.

Referring to FIG. 15, method 1500 begins at block 1502, in which a consumer is allowed to select a custom graphical user interface skinning and one or more consumer interests. In the embodiment shown in FIG. 15, a consumer can enter data via a user interface, such as 112 in FIG. 1, such as selection of one or more indicators corresponding to a particular custom graphical user interface skinning and consumer interests. Custom graphical user interface skinning can include, but is not limited to, a skin, a color, a design, a pattern, graphics, a theme, a content based theme, an audio file, a sound, or any other visual and/or audio configuration. For example, custom graphical user interface skinning can include, but is not limited to, MCDONALD'S™ colors and trademarks, COCA-COLA™ colors and trademarks, THE ATLANTA BRAVES™ baseball team colors and trademarks, and/or in general all types and kinds of organizations colors, graphics, and trademarks as may be required and/or desired in a particular embodiment. Consumer interests can include, but are not limited to, news, weather, sports, finance, and/or other types and kinds of interests, as may be required and/or desired in a particular embodiment. For example, if a consumer is interested in baseball, a custom graphical user interface can be skinned in a baseball theme. In another example, if a consumer likes NASCAR™ racing, then the custom graphical user interface can be skinned in a NASCAR™ racing theme, and news, weather, and sports information related to NASCAR™ racing can be obtained and used to populate the custom graphical user interface.

Block 1502 is followed by block 1504, in which one or more of the consumer's selected preferences and interests are stored. In this embodiment, a processor or controller, such as 106 in FIG. 1, associated with the product dispenser, such as 102A, can store one or more of the consumer's selected preferences and interests in an associated memory or data storage device, such as 110. In another example, the product dispenser, such as 102A, can transmit some or all of the consumer's selected preferences and interests to a local and/or remote server or data processing resource, such as 126, for storage in an associated memory or data storage device, such as 110. In any instance, one or more of the consumer's selected preferences and interests can be stored in an associated memory or other data storage device for subsequent retrieval and/or processing.

The method 1500 ends after block 1504.

Referring to FIG. 16, a method 1600 for utilizing one or more consumer preferences and interests to customize a graphical user interface is illustrated.

The method 1600 begins at block 1602, in which a consumer is identified by a product dispenser. In this embodiment, a product dispenser, such as 102A in FIG. 1, can receive or otherwise obtain identification information associated with a consumer. Based at least in part on the identification information, a processor or controller, such as 106, associated with the product dispenser, such as 102A, can identify the consumer. Such consumer identification can be by RFID, token, card, loyalty card, personal identification code, PIN, a consumer wireless data processing device, and/or by way of other types and kinds of identification devices or methods as may be required and/or desired in a particular embodiment.

Block 1602 is followed by block 1604, in which the product dispenser obtains one or more of the consumer's preferences and interests. In the embodiment shown, a processor or controller, such as 106 in FIG. 1, associated with the product dispenser, such as 102A, can transmit identification data to a local and/or remote server or data processing resource, such as 126. Based at least in part on the identification data, the local and/or remote server or data processing resource, such as 126, can obtain or otherwise locate one or more of the consumer's preferences and interests, which for instance, may be stored in a previously created account associated with the consumer.

Block 1604 is followed by block 1606, in which based at least in part on the consumer preferences a user interface is customized including interface skinning, and populating the interface with relevant consumer interest data. In the embodiment shown, a processor or controller, such as 106 in FIG. 1, associated with the product dispenser, such as 102A, can receive or otherwise obtain one or more consumer preferences, and the controller, such as 106, can utilize some or all of the consumer preferences to customize a graphical user interface, such as 112, associated with the product dispenser, such as 102A. Consumer interest data can include, but is not limited to, news, weather, sports, finance, and/or other types and/or kinds of digital content, as may be required and or desired in a particular embodiment.

The method 1600 ends after block 1606.

Referring to FIG. 17, an example method 1700 of configuring a product dispenser with a consumer's recipe is illustrated.

The method 1700 begins at block 1702, in which identification information or preference information associated with the consumer is received. In this embodiment, a product dispenser, such as 102A in FIG. 1, can receive or otherwise obtain identification information or preference information in the form of, for instance, encoded media information provided by a consumer. Encoded media information can include, but is not limited to, information associated with one or more of the following: a recipe profile, a list of one or more product ingredients, and a product. Encoded media which can store encoded media information can include, but is not limited to, a thumb drive, a memory stick, a memory, a data storage device, or any device or method capable of transferring data to a product dispenser. In one embodiment, a consumer can formulate one or more recipes and store the recipes on encoded media.

Block 1702 is followed by block 1704, in which the consumer's recipe profile is determined. In this embodiment, based at least in part on the encoded media information provided by the consumer, a processor or controller, such as 106 in FIG. 1, associated with the product dispenser, such as 102A, can determine a consumer recipe profile. A consumer recipe profile can include, but is not limited to, a recipe profile, a list of one or more product ingredients, and a product.

Block 1704 is followed by block 1706, in which the product dispenser is configured based at least in part on the consumer's recipe profile. In this embodiment, a processor or controller, such as 106 in FIG. 1, associated with the product dispenser 102A, can configure the product dispenser, such as 102A, by preparing any number of product ingredient packages, valves, and pumps for dispensing a desired product. In one embodiment, a consumer's recipe profile can enable a product dispenser to provide a consumer with one or more product or product formulations that the consumer has previously stored in the recipe profile.

Block 1706 is followed by block 1708, in which the consumer is allowed to dispense a product based at least in part on the consumer's recipe profile. In this embodiment, a processor or controller, such as 106 in FIG. 1, associated with the product dispenser, such as 102A, can formulate and dispense one or more products based at least in part on the consumer's recipe profile.

The method 1700 ends after block 1708.

Referring to FIG. 18, an example method of configuring a beverage forming dispenser with a consumer's recipe is illustrated.

The method 1800 begins at block 1802, in which consumer input is received by a beverage forming dispenser. In this embodiment, a beverage forming dispenser, such as 102A in FIG. 1, can receive or otherwise obtain input from a consumer, such as input from encoded media information associated with or otherwise provided by a consumer. Encoded media information can include, but is not limited to, information associated with one or more of the following: a recipe profile, a list of one or more beverage forming ingredients, and a beverage. Encoded media which can store encoded media information can include, but is not limited to, a thumb drive, a memory stick, a memory, a data storage device, or any device or method capable of transferring data to a beverage forming dispenser. In one embodiment, a consumer can formulate one or more recipes and store the recipes on encoded media prior to providing input to a beverage forming dispenser.

Block 1802 is followed by block 1804, in which the consumer's recipe profile is determined. In this embodiment, based at least in part on the input from the consumer, such as input from encoded media information provided by the consumer, a processor or controller, such as 106 in FIG. 1, associated with the beverage forming dispenser, such as 102A, can determine a consumer recipe profile. A consumer recipe profile can include, but is not limited to, a recipe profile, a list of one or more beverage forming ingredients, and a beverage.

Block 1804 is followed by block 1806, in which the beverage forming dispenser is configured with the consumer's recipe profile. In this embodiment, a processor or controller, such as 106 in FIG. 1, associated with the beverage forming dispenser 102A, can configure the beverage forming dispenser, such as 102A, by preparing any number of beverage forming ingredient packages, valves, and pumps for dispensing a desired beverage from or associated with the consumer's recipe profile. In one embodiment, a consumer's recipe profile can enable a beverage forming dispenser to provide a consumer with one or more beverage formulations that the consumer has previously stored in the recipe profile.

Block 1806 is followed by block 1808, in which the consumer is allowed to dispense beverages based at least in part on the consumer's recipe profile. In this embodiment, a processor or controller, such as 106 in FIG. 1, associated with the beverage forming dispenser, such as 102A, can formulate and dispense one or more beverages based at least in part on the consumer's recipe profile.

The method 1800 ends after block 1808.

Referring to FIG. 19, one example method 1900 of managing a consumer product or beverage list is illustrated.

The method 1900 begins at block 1902. In block 1902, a consumer is identified. In this embodiment, a product dispenser, such as 102A in FIG. 1, can receive or otherwise obtain identification information associated with a consumer. Based at least in part on the identification information, a processor or controller, such as 106, associated with the product dispenser, such as 102A, can identify the consumer. Such consumer identification can be by RFID, token, card, loyalty card, personal identification code, PIN, a consumer wireless data processing device, and/or by way of other types and kinds of identification devices or methods as may be required and/or desired in a particular embodiment.

In one embodiment, a consumer can present a personal identification code, such as a PIN code, via a client-type device or wireless communication device, such as 214A-214C, to a product dispenser. In other embodiments, a consumer can present a badge or magnetic card, and/or utilize other types and/or kinds of identification, as may be required and or desired in a particular embodiment.

Block 1902 is followed by block 1904, in which the consumer's past product list is retrieved. In the embodiment shown, a processor or controller, such as 106, in FIG. 1, associated with the product dispenser, such as 102A, can transmit identification data to a local and/or remote server or data processing resource, such as 126. Based at least in part on the identification data, the local and/or remote server or data processing resource, such as 126, can obtain or otherwise locate a past product list associated with the consumer. In one embodiment, a processor or controller, such as 126, may access an associated memory or data storage device, such as 110, to obtain or otherwise locate a past product list associated with the consumer. A past product list can include, but is not limited to, a historical listing of some or all prior or past products a particular consumer has requested, ordered, dispensed, or otherwise received from one or more product dispensers or other types of dispensers or devices. In any instance, a product dispenser can data communicate locally and/or remotely with a server or data processing resource to obtain the consumer's past product list.

Block 1904 is followed by block 1906, in which in view of the past product list, a next product for the consumer to try is determined. In the embodiment shown, a processor or controller, such as 106 in FIG. 1, associated with the product dispenser, such as 102A, can determine at least one next product for the consumer to try based at least in part on the past product list associated with the consumer. For example, a comparison of the relative frequencies one or more products or product formulations can be determined, and a next product for the consumer to try can be based on a relatively low or relatively high frequency that a particular product or product formulation appears on the past product list. In one example, a next product for the consumer to try may not appear on the past product list. In one embodiment, based at least in part on the past product list associated with the consumer, the local and/or remote server or data processing resource, such as 126, can determine at least one next product for the consumer to try. In any instance, in view of the past product list, a next product for the consumer to try can be determined.

Block 1906 is followed by block 1908, in which the consumer is prompted with information about the product that has been determined for the consumer to try. In the embodiment shown, a processor or controller, such as 106 in FIG. 1, associated with the product dispenser, such as 102A, can generate or otherwise transmit a communication to the consumer prompting the consumer with information associated with the product that has been determined for the consumer to try. The processor or controller, such as 106, can provide the message to the consumer via an output device, such as a user interface, for instance 112. Information associated with a product that has been determined for the consumer to try can include, but is not limited to, a product name, nutritional benefits, description of the type or kind of product or beverage, an infomercial, a television ad, and/or other types and/or kinds of information, as may be required and/or desired in a particular embodiment. In one embodiment, a local and/or remote server or data processing resource, such as 126, can generate a communication or other output, such as a message, and transmit the message to the product dispenser, such as 102A, for communication to the consumer prompting the consumer with information associated with the product that has been determined for the consumer to try. In another embodiment, a local and/or remote server or data processing resource, such as 126, can generate a communication or other output, such as a message, and transmit the message to consumer via a network, such as 104. The consumer can receive the message via a client-type device, mobile phone, wireless communication device, or any other communication device or method. The processor or controller, such as 106, associated with the product dispenser, such as 102A, can receive the message for communication to the consumer. In any instance, the consumer is prompted with information about the product that has been determined for the consumer to try.

Block 1908 is followed by decision block 1910, in which a determination is made as to whether the consumer wants to try the product. If the determination is in the affirmative, that is, the consumer wants to try the suggested product, then the method 1900 continues at block 1914. If the determination is in the negative, that is, the consumer does not want to try the suggested product, then the method 1900 continues at block 1912. In the embodiment shown in FIG. 19, a processor or controller, such as 106 in FIG. 1, associated with the product dispenser, such as 102A, can determine whether the consumer wants to try the product. For example, the processor or controller, such as 106, can receive a consumer input or selection via a user interface, such as 112, and determine whether the input or selection corresponds to whether the consumer wants to try the product.

In block 1912, an input is received from a consumer to select a product. In the embodiment shown, a processor or controller, such as 106 in FIG. 1, associated with the product dispenser, such as 102A, can allow the consumer to select a product. For example, after the consumer has had the opportunity to select a suggested or product that has been determined for the consumer to try, the consumer may decide or otherwise opt to try a different product in lieu of the suggested product. The consumer may select the different product via a user interface associated with the product dispenser, such as user interface, such as 112.

Block 1912 is followed by block 1916, in which the product is dispensed. In the embodiment shown, a processor or controller, such as 106 in FIG. 1, associated with the product dispenser, such as 102A, can allow the consumer to dispense a desired product.

Returning to block 1914, the consumer's past product list is updated with the current selection. In the embodiment shown, a processor or controller, such as 106 in FIG. 1, associated with the product dispenser, such as 102A, can update the past product list associated with the consumer with the current product selection. For example, the past product list can be updated such that the consumer will not be offered the particular product again, in the event the consumer did not select the product that has been determined for the consumer to try. In one embodiment, a local and/or remote server or data processing resource, such as 126, can update the past product list associated with the consumer with the current product selection. In any instance, the consumer's past product list is updated with the current selection.

Block 1914 is followed by block 1916, which is described above.

After block 1916, the method 1900 ends.

In one embodiment, one or more consumers can sign up to try one or more different product formulations. For example, each time a consumer identifies himself or herself to a product dispenser, the respective consumer's past product list history is retrieved. Once the past product list history has been retrieved, a determination is made to present the consumer with a product or formulation that they have not tried before. The consumer can elect to try the suggested formulation or product that has been determined for the consumer to try. When the suggested product formulation or product that has been determined for the consumer to try is dispensed to the consumer, then it is added to the past product list so that it will not be offered to the consumer again. In another embodiment, the past product list may be modified such that the suggested product formulation or product that has been determined for the consumer to try is offered less frequently or more frequently than other products or product formulations.

The capabilities of various embodiments of the invention can be implemented in software, firmware, hardware or some combination thereof.

As one example, one or more aspects of the invention can be included in an article of manufacture (e.g., one or more computer program products) having, for instance, computer usable media. The media has embodied therein, for instance, computer readable program code means for providing and facilitating the capabilities of the embodiment of the invention. The article of manufacture can be included as a part of a computer system or sold separately. One example of a suitable article of manufacture is a consumer interaction engine or module, such as 114 described in FIG. 1.

Additionally, at least one program storage device readable by a machine, tangibly embodying at least one program or set of instructions executable by the machine to perform the capabilities of the embodiment of the invention can be provided. One example of a suitable program storage device readable by machine is a memory or data storage device, such as 110 described in FIG. 1.

The flow diagrams depicted herein are examples. There may be many variations to these diagrams or the elements (or operations) described therein without departing from the scope of the claimed invention. For instance, the elements may be performed in a differing order, or elements may be added, deleted or modified. All of these variations are considered a part of the claimed invention.

While embodiments of the invention have been described, it will be understood that those skilled in the art, both now and in the future, may make various improvements and enhancements which fall within the scope of the claims which follow. These claims should be construed to maintain the proper protection for the invention first described.

The invention claimed is:

1. A method for interacting with a product dispenser, the method comprising:
   initiating presentation of a selection of products at a display of a remote device, the selection of products corresponding to one or more previously entered product preferences of a recipient consumer;
   receiving, via at least one processor, product identification information of a product from a purchasing consumer, wherein the product is one of the selection of products for the recipient consumer;
   receiving an instruction from the purchasing consumer to purchase the product for the recipient consumer;
   facilitating purchase of the product to provide to the recipient consumer; and
   dispensing the product at the product dispenser.

2. The method of claim 1, wherein receiving the product identification information comprises at least one of the following:
   receiving information via a user interface associated with a product dispenser, scanning a machine readable code, receiving a token or loyalty card, receiving a unique code, receiving information from a RFID tag, receiving information from a NFC tag, receiving information or a communication from a client-type device, or receiving information or a communication from a wireless communication device.

3. The method of claim 1, further comprising:
   providing product selection information at a user interface associated with the product dispenser, wherein the purchasing consumer is prompted to input selection of a product.

4. The method of claim 1, further comprising:
   providing product selection information at a user interface associated with a wireless communication device in communication with the product dispenser, wherein the purchasing consumer is prompted to input an instruction for selection of a product.

5. The method of claim 1, further comprising:
   receiving one or more product preferences associated with the recipient consumer; and
   prompting the recipient consumer to transmit the one or more product preferences to the purchasing consumer.

6. The method of claim 1, wherein the instruction is communicated by the purchasing consumer by at least one of the following: a voice input, a gesture input, or a manual input.

7. The method of claim 1, wherein facilitating purchase of the product to provide to the recipient consumer comprises transmitting one or more purchase instructions to a client-type device, a wireless communication device, or at least one product dispenser.

8. A product dispenser, comprising:
   an interface operable to receive user inputs and to present product information;
   a controller in communication with the interface, and operable to execute a set of instructions to:
      initiate presentation of a selection of products at a display of a remote device, the selection of products corresponding to one or more product preferences of a recipient consumer;
      receive, via at least one processor, product identification information of a product from a purchasing consumer, wherein the product is one of the selection of products for the recipient consumer;
      receive an instruction from the purchasing consumer to purchase the product for the recipient consumer;
      facilitate purchase of the product to provide to the recipient consumer; and
      dispense the product at the product dispenser.

9. The product dispenser of claim 8, wherein the set of instructions to receive product identification information from the purchasing consumer further comprise instructions to perform at least one of the following:
   receive information via a user interface associated with a product dispenser, scan a machine readable code, receive a token or loyalty card, receive a unique code, receive information from a RFID tag, receive information from a NFC tag, receive information or a communication from a client-type device, or receive information or a communication from a wireless communication device.

10. The product dispenser of claim 8, wherein the set of instructions further comprise instructions to:
provide product selection information at a user interface associated with the product dispenser, wherein the purchasing consumer is prompted to input selection of a product.

11. The product dispenser of claim 8, wherein the set of instructions further comprise instructions to:
provide product selection information at a user interface associated with a wireless communication device in communication with the product dispenser, wherein the purchasing consumer is prompted to input an instruction for selection of a product.

12. The product dispenser of claim 2, wherein the set of instructions further comprise instructions to:
receive one or more product preferences associated with the recipient consumer; and
prompt the recipient consumer to transmit the one or more product preferences to the purchasing consumer.

13. The product dispenser of claim 8, wherein the instruction is communicated by the purchasing consumer by at least one of the following: a voice input, a gesture input, or a manual input.

14. The product dispenser of claim 8, wherein the set of instructions to facilitate the product purchase for the recipient consumer further comprise instructions to transmit one or more purchase instructions to a client-type device, a wireless communication device, or at least one product dispenser.

15. A system comprising:
one or more servers;
a plurality of product dispensers in communication with the one or more servers via at least one network, wherein each of the plurality of product dispensers comprises:
a user interface operable to receive user inputs and to present product information; and
one or more processors in communication with the user interface, and operable to execute computer-executable instructions to:
initiate presentation of a selection of products at a display of a remote device, the selection of products corresponding to one or more product preferences of a recipient consumer;
receive product identification information of a product from a purchasing consumer, wherein the product is one of the selection of products for the recipient consumer;
receive an instruction from the purchasing consumer to purchase the product for the recipient consumer;
facilitate purchase of the product to provide to the recipient consumer; and
dispense the product at the product dispenser.

16. The system of claim 15, wherein the set of instructions to receive product identification information from the purchasing consumer further comprise instructions to perform at least one of the following:
receive information via a user interface associated with a product dispenser, scan a machine readable code, receive a token or loyalty card, receive a unique code, receive information from a RFID tag, receive information from a NFC tag, receive information or a communication from a client-type device, or receive information or a communication from a wireless communication device.

17. The system of claim 15, wherein the set of instructions further comprise instructions to:
provide product selection information at a user interface associated with the product dispenser, wherein the purchasing consumer is prompted to input selection of a product.

18. The system of claim 15, wherein the set of instructions further comprise instructions to:
provide product selection information at a user interface associated with a wireless communication device in communication with the product dispenser, wherein the purchasing consumer is prompted to input an instruction for selection of a product.

19. The system of claim 15, wherein the set of instructions further comprise instructions to:
receive one or more product preferences associated with the recipient consumer; and
prompt the recipient consumer to transmit the one or more product preferences to the purchasing consumer.

20. The system of claim 15, wherein the set of instructions to facilitate the product purchase for the recipient consumer further comprise instructions to transmit one or more purchase instructions to a client-type device, a wireless communication device, or at least one product dispenser.

* * * * *